United States Patent
Finn et al.

(10) Patent No.: US 11,799,776 B2
(45) Date of Patent: Oct. 24, 2023

(54) ETHERNET FRAME FORWARDING BASED ON CHECKING FOR AN ERROR IN THE ETHERNET FRAME

(71) Applicant: Huawei Technologies Co., Ltd., Shenzhen (CN)

(72) Inventors: Norman Finn, San Diego, CA (US); Tongtong Wang, Beijing (CN); Lihao Chen, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 196 days.

(21) Appl. No.: 17/367,017

(22) Filed: Jul. 2, 2021

(65) Prior Publication Data
US 2021/0336881 A1    Oct. 28, 2021

Related U.S. Application Data

(63) Continuation of application No. PCT/CN2019/070698, filed on Jan. 7, 2019.

(51) Int. Cl.
*H04L 12/24* (2006.01)
*H04L 45/74* (2022.01)
(Continued)

(52) U.S. Cl.
CPC ............ *H04L 45/74* (2013.01); *H04L 1/0056* (2013.01); *H04L 12/4645* (2013.01); *H04L 45/66* (2013.01)

(58) Field of Classification Search
CPC ............ H04L 1/00; H04L 45/66; H04L 45/74
See application file for complete search history.

(56) References Cited

U.S. PATENT DOCUMENTS

| 7,577,143 | B1 * | 8/2009 | Kompella | ............... | H04L 45/08 370/392 |
| 10,397,143 | B1 * | 8/2019 | Plenderleith | .......... | H04L 49/257 |

(Continued)

FOREIGN PATENT DOCUMENTS

| CN | 101159656 A | 4/2008 |
| CN | 101325472 A | 12/2008 |

(Continued)

OTHER PUBLICATIONS

Philip Koopman, "32-Bit Cyclic Redundancy Codes for Internet Applications," Preprint of a regular paper to appear in The International Conference on Dependable Systems and Networks (DSN), 2002, 11 pages.

(Continued)

*Primary Examiner* — Chi H Pham
*Assistant Examiner* — Elisabeth Benoit Magloire
(74) *Attorney, Agent, or Firm* — Conley Rose, P.C.

(57) ABSTRACT

A network device receives an Ethernet frame, checks a destination media access control (MAC) address based on a first cyclic redundancy check (CRC) code, to determine whether an error occurs in the destination MAC address. If the network device determines that no error occurs in the destination MAC address, the network device forwards the Ethernet frame based on the destination MAC address. The Ethernet frame includes the destination MAC address, the first CRC code, and a payload, a parameter of the first CRC code includes the destination MAC address, and the parameter of the first CRC code does not include the payload.

20 Claims, 11 Drawing Sheets

(51) Int. Cl.
  *H04L 1/00*   (2006.01)
  *H04L 12/46*  (2006.01)
  *H04L 45/00*  (2022.01)

(56) References Cited

U.S. PATENT DOCUMENTS

| | | | | |
|---|---|---|---|---|
| 10,686,732 | B2 | 6/2020 | Zinner | |
| 10,917,504 | B1* | 2/2021 | Plenderleith | H04L 41/069 |
| 11,070,471 | B1* | 7/2021 | Chang | H04L 12/4641 |
| 2003/0188190 | A1* | 10/2003 | Aaron | H04L 63/0227 |
| | | | | 726/23 |
| 2009/0210770 | A1* | 8/2009 | DeCusatis | H04L 1/004 |
| | | | | 714/776 |
| 2010/0157837 | A1 | 6/2010 | Lv et al. | |
| 2013/0121337 | A1* | 5/2013 | Nguyen | H04L 45/70 |
| | | | | 370/410 |
| 2014/0245114 | A1* | 8/2014 | Thaler | H04L 1/0061 |
| | | | | 370/389 |
| 2014/0254598 | A1* | 9/2014 | Jha | G16H 40/63 |
| | | | | 370/392 |
| 2015/0117177 | A1* | 4/2015 | Ganga | H04L 49/251 |
| | | | | 370/216 |
| 2016/0344601 | A1 | 11/2016 | Kaku | |
| 2017/0005833 | A1* | 1/2017 | Nishi | H04L 12/4641 |
| 2017/0099371 | A1* | 4/2017 | Yi | H04L 45/745 |
| 2018/0288706 | A1* | 10/2018 | Fang | H04L 27/2603 |
| 2019/0097758 | A1 | 3/2019 | Huang et al. | |
| 2019/0158125 | A1* | 5/2019 | Carlough | H04L 1/0041 |

FOREIGN PATENT DOCUMENTS

| | | | |
|---|---|---|---|
| CN | 101471924 | A | 7/2009 |
| CN | 102238063 | A | 11/2011 |
| CN | 107005593 | A | 8/2017 |
| CN | 107370674 | A | 11/2017 |
| EP | 3451595 | A1 | 3/2019 |
| WO | 2014081477 | A1 | 5/2014 |

OTHER PUBLICATIONS

IEEE Std 802.3TM-2018, (Revision of IEEE Std 802.3-2015), "IEEE Standard for Ethernet," LAN/MAN Standards Committee of the IEEE Computer Society, Approved Jun. 14, 2018, 5600 pages.

IEEE Std 802.1QTM-2018, (Revision of IEEE Std 802.1Q-2014), "IEEE Standard for Local and Metropolitan Area Networks—Bridges and Bridged Networks," Sponsor LAN/MAN Standards Committee of the IEEE Computer Society, Approved May 7, 2018, 1993 pages.

IEEE Std 802.1QbvTM-2015, (Amendment to IEEE Std 802.1Q-2014 as amended by IEEE Std 802.1Qca-2015, IEEE Std 802.1Qcd-2015, and IEEE Std 802.1Q-2014/Cor 1-2015), "IEEE Standard for Local and metropolitan area networks-Bridges and Bridged Networks Amendment 25: Enhancements for Scheduled Traffic," Sponsor LAN/MAN Standards Committee of the IEEE Computer Society, Approved Dec. 5, 2015, 57 pages.

Philip Koopman et al., "Cyclic Redundancy Code (CRC) Polynomial Selection For Embedded Networks," Preprint: The International Conference on Dependable Systems and Networks, DSN-2004, 11 pages.

Linus Thrybom, et al., "QoS in Switched Industrial Ethernet," 2009 IEEE, XP031575567, 8 pages.

IEEE Std 802.1ABTM-2016, (Revision of IEEE Std 802.1AB-2009), "IEEE Standard for Local and metropolitan area networks-Station and Media Access Control Connectivity Discovery," Approved Jan. 29, 2016, 146 pages.

IEEE Std 802.1CBTM-2017, "IEEE Standard for Local and metropolitan area networks-Frame Replication and Elimination for Reliability," Approved Sep. 28, 2017, 102 pages.

IEEE Std 802.1QccTM-2018, (Amendment to IEEE Std 802.1Q-2018 as amended by IEEE Std 802.1Qcp-2018), "IEEE Standard for Local and Metropolitan Area Networks-Amendment 31: Stream Reservation Protocol (SRP) Enhancements and Performance Improvements," Approved Jun. 14, 2018, 208 pages.

P802.1Qcr, "Standard for Local and metropolitan area networks-Bridges and Bridged Networks, Amendment: Asynchronous Traffic Shaping," Working Group: Higher Layer LAN Protocols Working Group (C/LM/WG802.1), Sponsoring Society and Committee: IEEE Computer Society/LAN/MAN Standards Committee (C/LM), Jun. 30, 2016, 2 pages.

* cited by examiner

ETHERNET FRAME FORWARDING BASED ON CHECKING FOR AN ERROR IN THE ETHERNET FRAME

CROSS-REFERENCE TO RELATED APPLICATIONS

This application is a continuation of International Patent Application No. PCT/CN2019/070698 filed on Jan. 7, 2019, the disclosure of which is hereby incorporated by reference in its entirety.

TECHNICAL FIELD

Embodiments of this application relate to computer network technologies, and in particular, to a data transmission method and apparatus.

BACKGROUND

The Ethernet is used to transmit an Ethernet frame. The Ethernet frame includes a frame header, a payload, and a frame check sequence (FCS). After receiving the Ethernet frame, a network device checks, based on the FCS, whether an error occurs in the frame header and the payload. If the network device determines that no error occurs in the frame header and the payload, the network device forwards the Ethernet frame. If the network device forwards the Ethernet frame before checking, based on the FCS, whether an error occurs in the frame header and the payload, the network device may forward the Ethernet frame in which an error occurs.

SUMMARY

Embodiments of this application provide a data transmission method and apparatus, to help prevent a network device from forwarding an Ethernet frame in which an error occurs.

To achieve the foregoing objective, the following technical solutions are used in the embodiments of this application.

According to a first aspect, an embodiment of this application provides a data transmission method. The method may be applied to a network device, or the method may be applied to a communications apparatus that can support the network device in implementing the method. For example, the communications apparatus includes a chip system, and the method includes: After receiving an Ethernet frame, the network device checks a destination media access control (MAC) address based on a first cyclic redundancy check (CRC) code, to determine whether an error occurs in the destination MAC address. If the network device determines that no error occurs in the destination MAC address, the network device forwards the Ethernet frame based on the destination MAC address. The Ethernet frame includes the destination media access control MAC address, the first cyclic redundancy check CRC code, and a payload, a parameter of the first CRC code includes the destination MAC address, and the parameter of the first CRC code does not include the payload. According to the data transmission method provided in this embodiment of this application, the first CRC code is added to the Ethernet frame, so that the network device can forward the Ethernet frame in a cut-through forwarding manner when the network device determines, based on the first CRC code, that a part of the received Ethernet frame is correct, to avoid forwarding the Ethernet frame in which an error occurs.

With reference to the first aspect, in a first possible implementation, the Ethernet frame further includes a first Ethernet type, where the first Ethernet type is used to indicate that the first CRC code is a CRC code, and the parameter of the first CRC code does not include the first Ethernet type. That the network device checks a destination MAC address based on a first CRC code includes: The network device determines, based on the first Ethernet type, that the first CRC code is the CRC code; and in response to that the first CRC code is the CRC code, the network device checks the destination MAC address based on the first CRC code. The network device may determine, based on a check result, whether to forward the Ethernet frame in the cut-through forwarding manner. For example, when no error occurs in the destination MAC address, the network device may forward the Ethernet frame in the cut-through forwarding manner. When an error occurs in the destination MAC address, the network device may discard the Ethernet frame.

Content checked by the network device based on the first CRC code may also be different based on different parameters required for generating the first CRC code. The following describes possible implementations.

With reference to the first aspect or the first possible implementation, in a second possible implementation, the Ethernet frame further includes a virtual local area network (VLAN) tag, and the parameter of the first CRC code further includes the VLAN tag. That the network device checks a destination MAC address based on a first CRC code, to determine whether an error occurs in the destination MAC address includes: The network device checks the destination MAC address and the VLAN tag based on the first CRC code, to determine whether an error occurs in the destination MAC address and the VLAN tag. That the network device forwards the Ethernet frame based on the destination MAC address if the network device determines that no error occurs in the destination MAC address includes: The network device forwards the Ethernet frame based on the destination MAC address if the network device determines that no error occurs in the destination MAC address and the VLAN tag.

With reference to the first aspect or the first possible implementation, in a third possible implementation, the Ethernet frame further includes a second Ethernet type, the parameter of the first CRC code further includes the second Ethernet type, the payload includes a protocol packet, and the second Ethernet type is used to indicate a protocol type of the protocol packet in the payload. The network device checks a destination MAC address based on a first CRC code, to determine whether an error occurs in the destination MAC address includes: The network device checks the destination MAC address and the second Ethernet type based on the first CRC code, to determine whether an error occurs in the destination MAC address and the second Ethernet type. That the network device forwards the Ethernet frame based on the destination MAC address if the network device determines that no error occurs in the destination MAC address includes: The network device forwards the Ethernet frame based on the destination MAC address if the network device determines that no error occurs in the destination MAC address and the second Ethernet type.

With reference to the first aspect or the first possible implementation, in a fourth possible implementation, the Ethernet frame further includes a source MAC address, and the parameter of the first CRC code further includes the source MAC address. That the network device checks a destination MAC address based on a first CRC code, to determine whether an error occurs in the destination MAC address includes: The network device checks the destination MAC address and the source MAC address based on the first CRC code, to determine whether an error occurs in the destination MAC address and the source MAC address. That the network device forwards the Ethernet frame based on the destination MAC address if the network device determines that no error occurs in the destination MAC address includes: The network device forwards the Ethernet frame based on the destination MAC address if the network device determines that no error occurs in the destination MAC address and the source MAC address.

Optionally, check may be performed in combination with the second possible implementation to the fourth possible implementation.

For example, the network device checks the destination MAC address, the source MAC address, and the VLAN tag based on the first CRC code, to determine whether an error occurs in the destination MAC address, the source MAC address, and the VLAN tag. The source MAC address, and the VLAN tag, the network device forwards the Ethernet frame based on the destination MAC address if the network device determines that no error occurs in the destination MAC address.

For example, the network device checks the destination MAC address, the source MAC address, the VLAN tag, and the second Ethernet type based on the first CRC code, to determine whether an error occurs in the destination MAC address, the source MAC address, the VLAN tag, and the second Ethernet type. The network device forwards the Ethernet frame based on the destination MAC address if the network device determines that no error occurs in the destination MAC address, the source MAC address, the VLAN tag, and the second Ethernet type.

With reference to the first aspect or the foregoing possible implementations, in a fifth possible implementation, the Ethernet frame further includes a second CRC code, and a parameter of the second CRC code includes a destination MAC address, a source MAC address, a first Ethernet type, a first CRC code, a VLAN tag, a second Ethernet type, and a payload.

With reference to the fifth possible implementation, in a sixth possible implementation, after the network device forwards the Ethernet frame based on the destination MAC address, the method further includes: The network device checks the destination MAC address, the source MAC address, the first Ethernet type, the first CRC code, the VLAN tag, the second Ethernet type, and the payload based on the second CRC code, to determine whether an error occurs in the destination MAC address, the source MAC address, the first Ethernet type, the first CRC code, the VLAN tag, the second Ethernet type, and the payload.

According to a second aspect, an embodiment of this application provides a data transmission method. The method may be applied to a network device, or the method may be applied to a communications apparatus that can support the network device in implementing the method. For example, the communications apparatus includes a chip system. The method includes: The network device generates an Ethernet frame, and sends the Ethernet frame. The Ethernet frame includes a destination MAC address, a first CRC code, and a payload, a parameter of the first CRC code includes the destination MAC address, and the parameter of the first CRC code does not include the payload. According to the data transmission method provided in this embodiment of this application, the first CRC code is added to the Ethernet frame, so that a receiving device can forward the Ethernet frame in a cut-through forwarding manner when the receiving unit determines, based on the first CRC code, that a part of the received Ethernet frame is correct. This prevents the receiving device from forwarding the Ethernet frame in which an error occurs.

With reference to the second aspect, in a first possible implementation, the Ethernet frame further includes a first Ethernet type, where the first Ethernet type is used to indicate that the first CRC code is a CRC code, and the parameter of the first CRC code does not include the first Ethernet type.

With reference to the second aspect or the first possible implementation, in a second possible implementation, the Ethernet frame further includes a VLAN tag, and the parameter of the first CRC code further includes the VLAN tag.

With reference to the second aspect or the foregoing possible implementations, in a third possible implementation, the Ethernet frame further includes a second Ethernet type, the parameter of the first CRC code further includes the second Ethernet type, the payload includes a protocol packet, and the second Ethernet type is used to indicate a protocol type of a protocol packet in the payload.

With reference to the second aspect or the foregoing possible implementations, in a fourth possible implementation, the Ethernet frame further includes a source MAC address.

With reference to the second aspect or the foregoing possible implementations, in a fifth possible implementation, the Ethernet frame further includes a second CRC code, and a parameter of the second CRC code includes a destination MAC address, a source MAC address, a first Ethernet type, a first CRC code, a VLAN tag, a second Ethernet type, and a payload.

It should be noted that, in any one of the foregoing aspects, the first Ethernet type and the first CRC code may be located after the source MAC address. Alternatively, the first Ethernet type and the first CRC code may be located after the VLAN tag. A quantity of bits in the first Ethernet type is 16, and a quantity of bits in the first CRC code is 16.

In addition, the Ethernet frame may further include a version field and a reserved field. A quantity of bits in the first Ethernet type is 16, a quantity of bits in the version field is 1, a quantity of bits in the reserved field is 3, and a quantity of bits in the first CRC code is 12. Alternatively, a quantity of bits in the first Ethernet type is 16, a quantity of bits in the version field is 1, a quantity of bits in the reserved field is 15, and a quantity of bits in the first CRC code is 16.

According to a third aspect, an embodiment of this application provides a data transmission method. The method may be applied to a network device, or the method may be applied to a communications apparatus that can support the network device in implementing the method. For example, the communications apparatus includes a chip system, and the method includes: After receiving an Ethernet frame, the network device checks a destination MAC address and only a part of a payload based on a first CRC code, to determine whether an error occurs in the destination MAC address and only the part of the payload. The network device forwards the Ethernet frame based on the destination MAC address if the network device determines that no error occurs in the destination MAC address and only the part of the payload. The Ethernet frame includes the destination MAC address, the first CRC code, and the payload, a parameter of the first CRC code includes the destination MAC address and only the part of the payload. According to the data transmission method provided in this embodiment of this application, the first CRC code is added to the Ethernet frame, so that the network device can forward the Ethernet frame in a cut-through forwarding manner when the network device determines, based on the first CRC code, that a part of the received Ethernet frame is correct, to avoid forwarding the Ethernet frame in which an error occurs.

With reference to the third aspect, in a first possible implementation, the Ethernet frame further includes a first Ethernet type, where the first Ethernet type is used to indicate that the first CRC code is a CRC code, and the parameter of the first CRC code does not include the first Ethernet type. That the network device checks a destination MAC address based on a first CRC code includes: The network device determines, based on the first Ethernet type, that the first CRC code is the CRC code; and in response to that the first CRC code is the CRC code, the network device checks the destination MAC address based on the first CRC code. The network device may determine, based on a check result, whether to forward the Ethernet frame in the cut-through forwarding manner. For example, when no error occurs in the destination MAC address, the network device may forward the Ethernet frame in the cut-through forwarding manner. When an error occurs in the destination MAC address, the network device may discard the Ethernet frame.

Content checked by the network device based on the first CRC code may also be different based on different parameters required for generating the first CRC code. The following describes possible implementations.

With reference to the third aspect or the first possible implementation, in a second possible implementation, the Ethernet frame further includes a VLAN tag, and the parameter of the first CRC code further includes the VLAN tag. That the network device checks a destination MAC address and only a part of a payload based on a first CRC code, to determine whether an error occurs in the destination MAC address and only the part of the payload includes: The network device checks the destination MAC address, only the part of the payload, and the VLAN tag based on the first CRC code, to determine whether an error occurs in the destination MAC address, only the part of the payload, and the VLAN tag. That the network device forwards the Ethernet frame based on the destination MAC address if the network device determines that no error occurs in the destination MAC address and only the part of the payload includes: the network device forwards the Ethernet frame based on the destination MAC address if the network device determines that no error occurs in the destination MAC address, only the part of the payload, and the VLAN tag.

With reference to the third aspect or the first possible implementation, in a third possible implementation, the Ethernet frame further includes a second Ethernet type, the parameter of the first CRC code further includes the second Ethernet type, the payload includes a protocol packet, the protocol packet includes a protocol header and a packet payload, only the part of the payload included in the parameter of the first CRC code is at least one part of the protocol header, and the second Ethernet type is used to indicate a protocol type of the protocol packet in the payload. That the network device checks a destination MAC address and only a part of a payload based on a first CRC code, to determine whether an error occurs in the destination MAC address and only the part of the payload includes: The network device checks the destination MAC address, only the part of the payload, and the second Ethernet type based on the first CRC code, to determine whether an error occurs in the destination MAC address, only the part of the payload, and the second Ethernet type. That the network device forwards the Ethernet frame based on the destination MAC address if the network device determines that no error occurs in the destination MAC address and only the part of the payload includes: The network device forwards the Ethernet frame based on the destination MAC address if the network device determines that no error occurs in the destination MAC address, only the part of the payload, and the second Ethernet type.

With reference to the third aspect or the first possible implementation, in a fourth possible implementation, the Ethernet frame further includes a source MAC address, and the parameter of the first CRC code further includes the source MAC address. That the network device checks a destination MAC address and only a part of a payload based on a first CRC code, to determine whether an error occurs in the destination MAC address and only the part of the payload includes: The network device checks the destination MAC address, only the part of the payload, and the source MAC address based on the first CRC code, to determine whether an error occurs in the destination MAC address, only the part of the payload, and the source MAC address. The network device forwards the Ethernet frame based on the destination MAC address if the network device determines that no error occurs in the destination MAC address and only the part of the payload includes: The network device forwards the Ethernet frame based on the destination MAC address if the network device determines that no error occurs in the destination MAC address, only the part of the payload, and the source MAC address.

Optionally, check may be performed in combination with the second possible implementation to the fourth possible implementation.

For example, the network device checks the destination MAC address, the source MAC address, the VLAN tag, and only the part of the payload based on the first CRC code, to determine whether an error occurs in the destination MAC address, the source MAC address, the VLAN tag, and only the part of the payload. The VLAN tag, and only the part of the payload, the network device forwards the Ethernet frame based on the destination MAC address if the network device determines that no error occurs in the destination MAC address, the source MAC address.

For example, the network device checks the destination MAC address, the source MAC address, the VLAN tag, the second Ethernet type, and only the part of the payload based on the first CRC code, to determine whether an error occurs in the destination MAC address, the source MAC address, the VLAN tag, the second Ethernet type, and only the part of the payload. The network device forwards the Ethernet frame based on the destination MAC address if the network device determines that no error occurs in the destination MAC address, the source MAC address, the VLAN tag, the second Ethernet type, and only the part of the payload.

With reference to the third aspect or the foregoing possible implementations, in a fifth possible implementation, the Ethernet frame further includes a second CRC code, and a parameter of the second CRC code includes a destination MAC address, a source MAC address, a first Ethernet type, a first CRC code, a VLAN tag, a second Ethernet type, and a payload.

With reference to the fifth possible implementation, in a sixth possible implementation, after the network device forwards the Ethernet frame based on the destination MAC address, the method further includes: The network device checks the destination MAC address, the source MAC address, the first Ethernet type, the first CRC code, the VLAN tag, the second Ethernet type, and the payload based on the second CRC code, to determine whether an error occurs in the destination MAC address, the source MAC address, the first Ethernet type, the first CRC code, the VLAN tag, the second Ethernet type, and the payload.

According to a fourth aspect, an embodiment of this application provides a data transmission method. The method may be applied to a network device, or the method may be applied to a communications apparatus that can support the network device in implementing the method. For example, the communications apparatus includes a chip system. The method includes: The network device generates an Ethernet frame, and sends the Ethernet frame. The Ethernet frame includes a destination MAC address, a first CRC code, and a payload, a parameter of the first CRC code includes the destination MAC address and only a part of the payload. According to the data transmission method provided in this embodiment of this application, the first CRC code is added to the Ethernet frame, so that the network device can forward the Ethernet frame in a cut-through forwarding manner when the network device determines, based on the first CRC code, that a part of the received Ethernet frame is correct, to avoid forwarding the Ethernet frame in which an error occurs.

With reference to the fourth aspect, in a first possible implementation, the Ethernet frame further includes a first Ethernet type, where the first Ethernet type is used to indicate that the first CRC code is a CRC code, and the parameter of the first CRC code does not include the first Ethernet type.

With reference to the fourth aspect or the first possible implementation, in a second possible implementation, the Ethernet frame further includes a virtual local area network VLAN tag, and the parameter of the first CRC code further includes the VLAN tag.

With reference to the fourth aspect or the foregoing possible implementations, in a third possible implementation, the Ethernet frame further includes a second Ethernet type, the parameter of the first CRC code further includes the second Ethernet type, the payload includes a protocol packet, the protocol packet includes a protocol header and a packet payload, only the part of the payload included in the parameter of the first CRC code is at least one part of the protocol header, and the second Ethernet type is used to indicate a protocol type of the protocol packet in the payload.

With reference to the fourth aspect or the foregoing possible implementations, in a fourth possible implementation, the Ethernet frame further includes a source MAC address.

With reference to the fourth aspect or the foregoing possible implementations, in a fifth possible implementation, the Ethernet frame further includes a second CRC code, and a parameter of the second CRC code includes a destination MAC address, a source MAC address, a first Ethernet type, a first CRC code, a VLAN tag, a second Ethernet type, and a payload.

It should be noted that, in any one of the foregoing aspects, the first Ethernet type and the first CRC code may be located after the source MAC address. Alternatively, the first Ethernet type and the first CRC code may be located after the VLAN tag. A quantity of bits in the first Ethernet type is 16, and a quantity of bits in the first CRC code is 16.

In addition, the Ethernet frame may further include a version field and a reserved field. A quantity of bits in the first Ethernet type is 16, a quantity of bits in the version field is 1, a quantity of bits in the reserved field is 3, and a quantity of bits in the first CRC code is 12. Alternatively, a quantity of bits in the first Ethernet type is 16, a quantity of bits in the version field is 1, a quantity of bits in the reserved field is 15, and a quantity of bits in the first CRC code is 16.

According to a fifth aspect, an embodiment of this application further provides a data transmission apparatus, configured to implement the methods described in the first aspect to the fourth aspect. The data transmission apparatus is a network device or a communications apparatus that supports the network device in implementing the methods described in the first aspect to the fourth aspect. For example, the communications apparatus includes a chip system. For example, the data transmission apparatus includes a processing unit, a sending unit, and a receiving unit. The processing unit is configured to generate an Ethernet frame, and the processing unit is further configured to check a part of the Ethernet frame based on a first CRC code. The sending unit is configured to send the Ethernet frame. The receiving unit is configured to receive the Ethernet frame.

Optionally, for a manner in which the data transmission apparatus performs specific functions, refer to corresponding descriptions in the methods in the first aspect to the fourth aspect. Details are not described herein again.

It should be noted that, the functional modules in the fifth aspect may be implemented by hardware, or may be implemented by hardware by executing corresponding software. The hardware or software includes one or more modules corresponding to the foregoing functions. For example, a transceiver is configured to complete functions of the receiving unit and the sending unit, a processor is configured to complete functions of the processing unit, and a memory is configured to store a program instruction used by the processor to perform the methods in the embodiments of this application. The processor, the transceiver, and the memory are connected and implement mutual communication by using a bus. For details, refer to the actions of the network device in the method according to the first aspect to the method according to the fourth aspect.

According to a sixth aspect, an embodiment of this application further provides a data transmission apparatus, configured to implement the methods described in the first aspect to the fourth aspect. The data transmission apparatus is a network device or a communications apparatus that supports the network device in implementing the methods described in the first aspect to the fourth aspect. For example, the communications apparatus includes a chip system. For example, the data transmission apparatus includes a processor, configured to implement functions of the methods described in the first aspect to the fourth aspect. The data transmission apparatus may further include a memory, configured to store a program instruction and data. The memory is coupled to the processor. The processor may invoke and execute the program instruction stored in the memory, to implement the functions in the methods described in the first aspect to the fourth aspect. The data transmission apparatus may further include a communications interface, and the communications interface is used by the data transmission apparatus to communicate with another device. For example, if the data transmission apparatus is a network device, the other device is a terminal device.

According to a seventh aspect, an embodiment of this application further provides a computer-readable storage medium, including a computer software instruction. When the computer software instruction is run in a data transmission apparatus, the data transmission apparatus is enabled to perform the method according to any one of the first aspect to the fourth aspect.

According to an eighth aspect, an embodiment of this application further provides a computer program product including an instruction. When the computer program product runs in a data transmission apparatus, the data transmission apparatus is enabled to perform the method according to any one of the first aspect to the fourth aspect.

According to a ninth aspect, an embodiment of this application provides a chip system. The chip system includes a processor, and may further include a memory, and is configured to implement a function of the network device in the foregoing methods. The chip system may include a chip, or may include a chip and another discrete component.

In addition, for technical effects brought by any design manner of the foregoing aspect, refer to technical effects brought by different design manners of the first aspect to the fourth aspect. Details are not described herein again.

In the embodiments of this application, a name of the data transmission apparatus constitutes no limitation on the device. In actual implementation, the devices may have other names, provided that functions of each device are similar to those in the embodiments of this application, and fall within the scope of the claims of this application and the equivalent technologies thereof.

DESCRIPTION OF EMBODIMENTS

Figure 1:
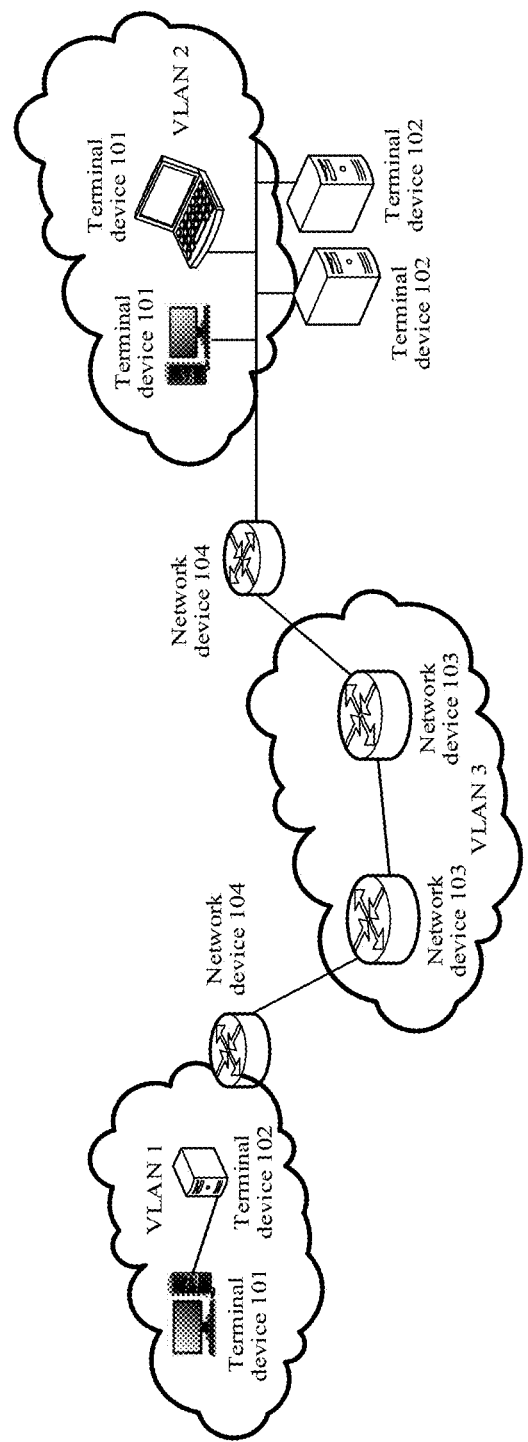
FIG. 1 is a simplified example diagram of a communications system according to an embodiment of this application.

In the specification and claims of this application, the terms "first", "second", "third" and so on are intended to distinguish between different objects but do not limit a particular order.

In addition, in the embodiments of this application, the word "exemplary" or "for example" is used to represent giving an example, an illustration, or a description. Any embodiment or design scheme described as an "exemplary" or "for example" in the embodiments of this application should not be explained as being more preferred or having more advantages than another embodiment or design scheme. Exactly, use of the word "for example" or "example" or the like is intended to present a relative concept in a specific manner.

First, to make descriptions of the following embodiments clear and concise, related technologies are briefly described below.

An Ethernet type in this application is a 2-byte field in an Ethernet frame. For example, a first Ethernet type is a 2-byte field. A second Ethernet type is a 2-byte field.

In the Ethernet, a network device may encapsulate user data into an Ethernet frame based on an Open Systems Interconnection (OSI) reference model or a Transmission Control Protocol (TCP)/Internet Protocol (IP) Suite and transmit the Ethernet frame to a device at a receive end. A forwarding mode of the Ethernet frame may be classified into a cut-through forwarding manner and a store-and-forward manner. The store-and-forward manner includes: when receiving all bits of an Ethernet frame, a device checks whether a frame header and a payload that are in the received Ethernet frame are correct based on a cyclic redundancy check (CRC) code included in a frame check sequence (FCS) field in the Ethernet frame. If the frame header and the payload that are in the received Ethernet frame are correct, a forwarding table is searched for an egress port corresponding to a destination MAC address based on the destination MAC address in the Ethernet frame. The Ethernet frame is forwarded through the egress port. The CRC is a function that generates a check code of a fixed length based on a network data packet or computer file data. The CRC is used to check whether an error occurs in transmitted data or stored data. The CRC is used to detect an error by using a division and remainder principle. That the received Ethernet frame is correct means that both the frame header and the payload that are included in the received Ethernet frame are correct. That the received Ethernet frame is correct may also mean that no error occurs in the frame header and the payload that are included in the received Ethernet frame. That the received Ethernet frame is incorrect means that an error occurs in at least one of the frame header and the payload that are included in the received Ethernet frame. That the received Ethernet frame is incorrect may also mean that an error occurs in at least one of the frame header and the payload that are included in the received Ethernet frame. It may be understood that, when the Ethernet frame is detected based on the FCS to determine that an error occurs in the Ethernet frame, an error occurs in at least one of the frame header and the payload that are included in the Ethernet frame. However, the device cannot determine where the error occurs. For example, the device cannot determine whether the error is specifically an error occurring in the frame header, an error occurring in the payload, or an error occurring in the frame header and the payload. The cut-through forwarding manner includes: Before receiving a complete Ethernet frame, the device forwards, based on related information in a frame header of the Ethernet frame, information in the Ethernet frame to a corresponding egress port. In other words, before the device checks the frame header and a payload that are of the Ethernet frame based on an FCS of the Ethernet frame, the device may forward the information (for example, the destination MAC address) in the Ethernet frame through the egress port. Compared with the store-and-forward manner, the cut-through forwarding manner may reduce duration for which the Ethernet frame stays in the device.

An error may occur in the Ethernet frame received by the device. The device may check the Ethernet frame based on the CRC code carried in the FCS field in the Ethernet frame, so as to determine whether an error occurs in the Ethernet frame. During cut-through forwarding, the device has started to forward the first bit of the Ethernet frame before receiving the last bit of the Ethernet frame. In other words, the device forwards the error Ethernet frame in which an error occurs. Forwarding the Ethernet frame in which the error occurs occupies resources and affects forwarding of a normal Ethernet frame. The foregoing situation has adverse impact on a network. For example, a Time-Sensitive Networking (TSN) network is affected. For the TSN, refer to Institute of Electrical and Electronics Engineers (IEEE) 802.1Qbv.

To resolve the foregoing problem, an embodiment of this application provides a data transmission method. A basic principle of the data transmission method is as follows: when receiving an Ethernet frame, a network device checks a destination MAC address based on a first CRC code, to determine whether an error occurs in the destination MAC address. The network device forwards the Ethernet frame based on the destination MAC address if the network device determines that no error occurs in the destination MAC address. Alternatively, the network device checks a destination MAC address and only a part of a payload based on a first CRC code, to determine whether an error occurs in the destination MAC address and only the part of the payload. The network device forwards the Ethernet frame based on the destination MAC address if the network device determines that no error occurs in the destination MAC address and only the part of the payload. The Ethernet frame includes the destination MAC address, the first CRC code, and the payload, a parameter of the first CRC code includes the destination MAC address, and the parameter of the first CRC code does not include the payload or the parameter of the first CRC code further include only the part of the payload. According to the data transmission method provided in this embodiment of this application, the first CRC code is added to the Ethernet frame, so that the network device can forward the Ethernet frame in a cut-through forwarding manner when the network device determines, based on the first CRC code, that a part of the received Ethernet frame is correct, to avoid forwarding the Ethernet frame in which an error occurs.

The following describes in detail the embodiments of this application with reference to accompanying drawings.

FIG. 1 is a simplified example diagram of a communications system to which an embodiment of this application may be applied. As shown in FIG. 1, the communications system may include at least one user equipment (UE) (for example, a terminal device 101 and a terminal device 102 shown in FIG. 1) and at least one network device (for example, a network device 103 and a network device 104 shown in FIG. 1). The terminal device may be a virtual machine, a host, or a server. The network device may be a router or a bridge. The terminal device and the network device may be connected through a cable or an optical fiber. The at least one terminal device and the at least one network device may belong to a same virtual local area network (VLAN), or may belong to different VLANs. Different VLANs can be connected through a gateway.

It should be noted that FIG. 1 is merely a schematic diagram. The communications system may further include another network device, for example, a switch not shown in FIG. 1. In addition, the communications system shown in FIG. 1 may further include another network, for example, a core network. A quantity of sites, routers, gateways, and switches included in the communications system is not limited in this embodiment of this application.

The network device and the terminal device may be deployed on land, including an indoor or outdoor device, a handheld device, or a vehicle-mounted device, or may be deployed on a water surface, or may be deployed on an aircraft, a balloon, a satellite in the air. Application scenarios of the network device and the terminal device are not limited in this embodiment of this application.

Figure 2A:
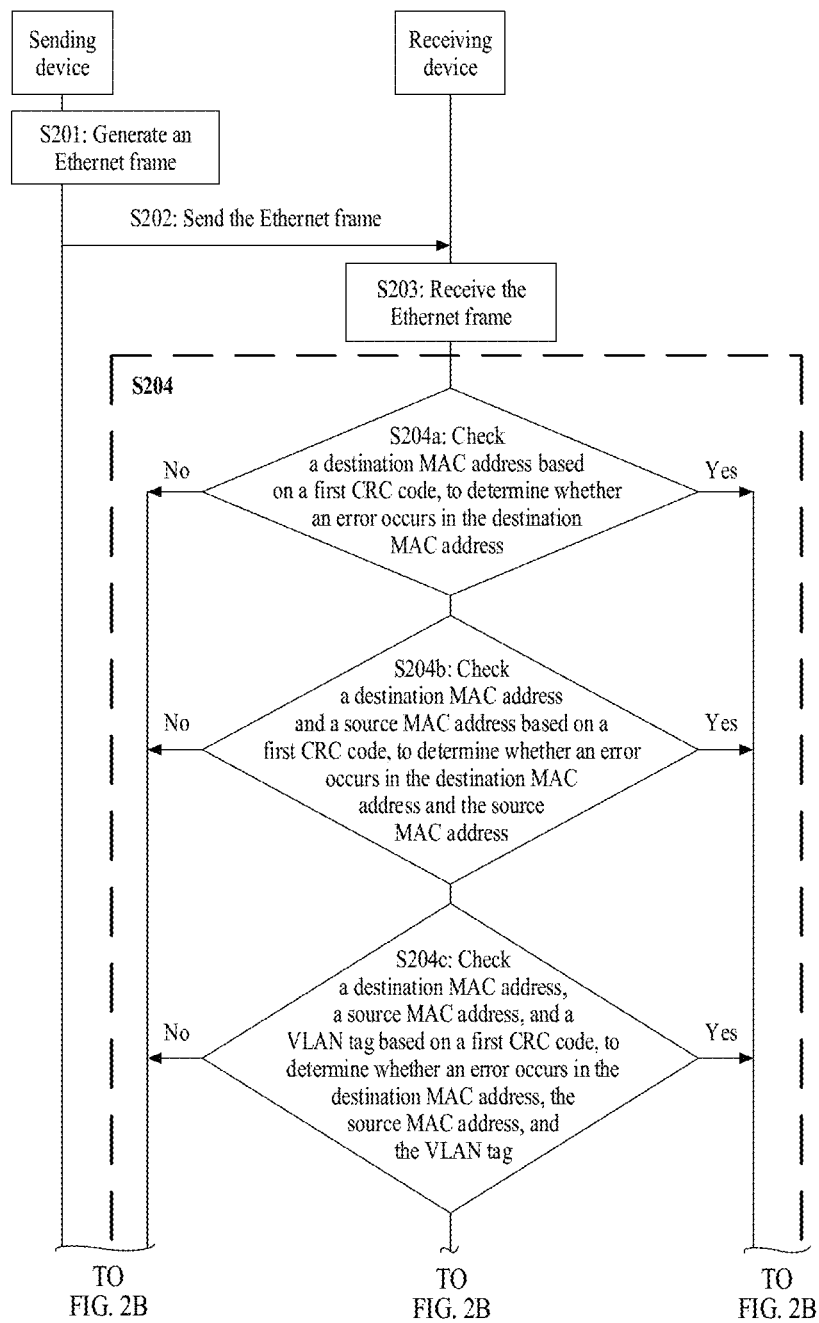
FIG. 2A and FIG. 2B are a flowchart of a data transmission method according to an embodiment of this application.
Figure 2B:
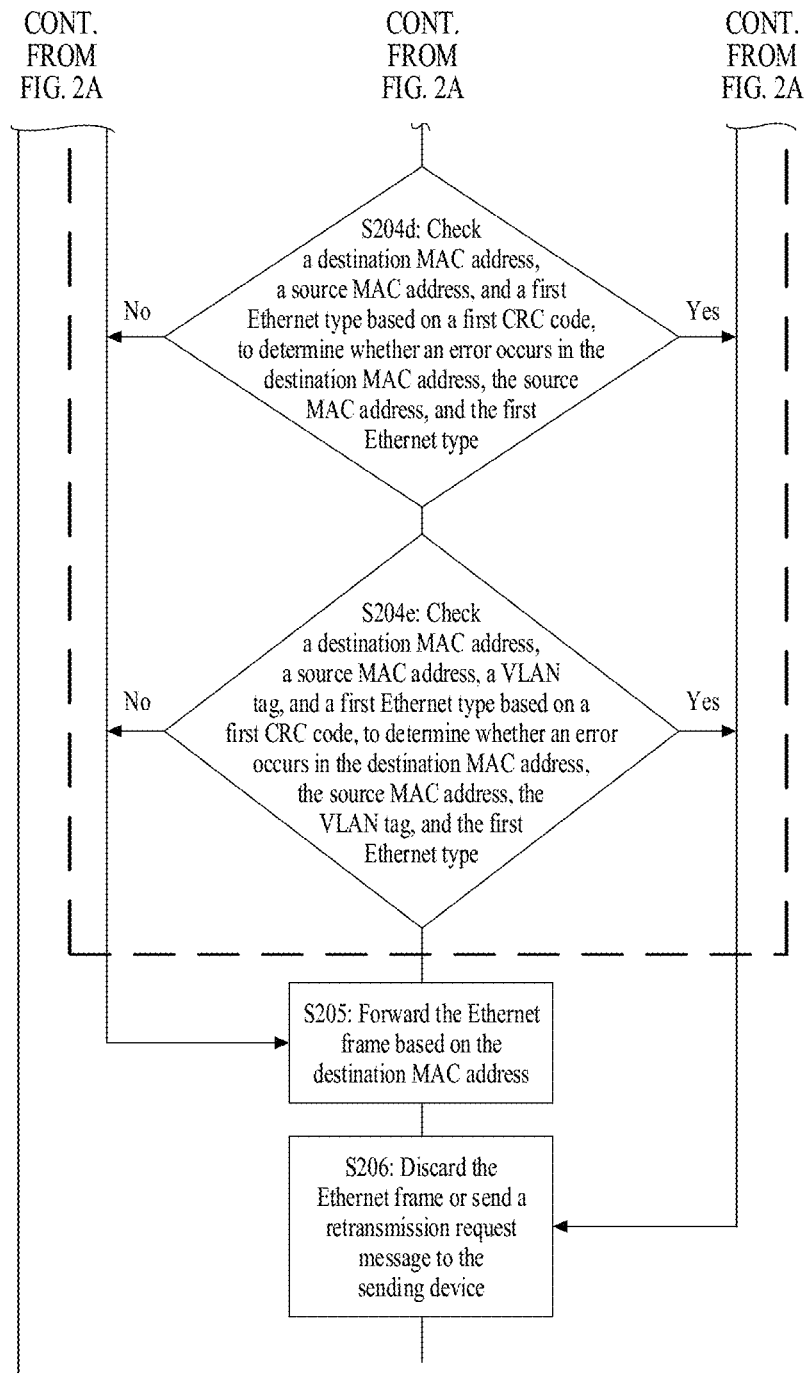

The following describes the data transmission method provided in the embodiment of this application in detail by using a sending device and a receiving device as an example. The sending device may be a site (a start device that sends an Ethernet frame), a router, a bridge, or the like. For example, the sending device may be the terminal device 101 in FIG. 1. The receiving device may be a router, a bridge, or the like. For example, the receiving device may be the network device 103 in FIG. 1. FIG. 2A and FIG. 2B are a flowchart of a data transmission method according to an embodiment of this application. The communications system shown in FIG. 1 may perform the method shown in FIG. 2A and FIG. 2B. In a possible design, the method shown in FIG. 2A and FIG. 2B may include S201, S202, S203, S204, and S205. In a possible design, the method shown in FIG. 2A and FIG. 2B may include S201, S202, S203, S204, and S206.

S201: A sending device generates an Ethernet frame.

The Ethernet frame includes a frame header, a payload, and a frame check sequence (FCS). The frame header includes a destination MAC address, a source MAC address, and a first Ethernet type. The destination MAC address is adjacent to the source MAC address. The destination MAC address is located before the source MAC address. The first Ethernet type is adjacent to the payload. The payload is adjacent to the FCS. The first Ethernet type is located before the payload. The payload is located before the FCS. For a structure of the Ethernet frame, refer to the IEEE802.3. According to the IEEE802.3, a quantity of bytes in the payload ranges from 46 to 1500. In a possible implementation, the frame header further includes a VLAN tag. The destination MAC address is used to indicate an address of a receiving device that receives the Ethernet frame. The source MAC address is used to indicate an address of the sending device that sends the Ethernet frame. The VLAN tag indicates a VLAN identifier. For example, the VLAN tag may be a customer tag (C-tag), a service tag (S-tag), or a backbone tag (B-tag). For the VLAN tag, refer to the IEEE 802.1Q.

The first Ethernet type is used to indicate a protocol type of a protocol packet in the payload. The protocol packet is a packet that complies with a specific protocol. The protocol packet may be an Internet Protocol version 4 (IPv4) packet, an Address Resolution Protocol (ARP) packet, a Point-to-Point Protocol (PPPoE) packet, or an Internet Protocol version 6 (IPv6) packet. For example, when a value of the first Ethernet type is 0x0800, the first Ethernet type indicates that the protocol type of the protocol packet in the payload is IPv4. When a value of the first Ethernet type is 0x0806, the first Ethernet type indicates that the protocol type of the protocol packet in the payload is ARP. When a value of the first Ethernet type is 0x8864, the first Ethernet type indicates that the protocol type of the protocol packet in the payload is PPPoE. When a value of the first Ethernet type is 0x86DD, the first Ethernet type indicates that the protocol type of the protocol packet in the payload is IPv6. When a value of the first Ethernet type is 0x8847, the first Ethernet type indicates that the protocol type of the protocol packet in the payload is a Multiprotocol Label Switching (MPLS) protocol.

At a physical layer, the transmitted Ethernet frame is represented by a quantity of bits. A task of the physical layer is to transparently transmit a bit stream. In other words, meaning of each bit does not need to be considered at the physical layer, provided that the bit stream is transmitted at the physical layer. When a transmit end sends 1, a receive end should receive 1. If the receive end receives 0, it indicates that an error occurs in information received by the receive end. Similarly, when a transmit end sends 0, a receive end should receive 0. If the receive end receives 1, it indicates that an error occurs in information received by the receive end. During data transmission, no matter how perfect a design of a transmission system is, an error always exists. Such error may cause one or more frames transmitted on a link to be damaged (a bit error occurs, for example, 0 changes to 1, or 1 changes to 0). As a result, a receiver receives data in which an error occurs. To improve correctness of the data received by the receiver, the receiver needs to perform error detection on the data before receiving the data. The receiver receives the data only when a detection result indicates that the data is correct. There are a plurality of detection manners, and a parity check, an internet check, a cyclic redundancy check, and the like are common manners.

The Ethernet frame may include a first CRC code and a second CRC code. Specifically, the frame header includes the first CRC code. The FCS carries the second CRC code. The following describes a CRC code. The CRC code in the following may be the first CRC code, or may be the second CRC code. When a CRC code of input data is calculated, the input data is used as a dividend, and a generator polynomial corresponding to a CRC algorithm is used as a divisor, to calculate a remainder. The remainder is the CRC code. The CRC algorithm may be a CRC-32 algorithm. In this application, a parameter of the CRC code is input data required for calculating the CRC code. It may be understood that the parameter of the CRC code is a dividend required for calculating the CRC code.

A parameter required for generating the first CRC code includes a part of the Ethernet frame. The part of the Ethernet frame may be the frame header of the Ethernet frame. In a possible design, the frame header includes the destination MAC address, the source MAC address, and the first Ethernet type. In another possible design, the frame header includes the destination MAC address, the source MAC address, the VLAN tag, and the first Ethernet type. In another possible design, the part of the Ethernet frame may also be a part of the frame header. The parameter required for generating the first CRC code may include the destination MAC address, and does not include the payload. Further, the parameter required for generating the first CRC code may further include at least one of the source MAC address, the VLAN tag, and the first Ethernet type. The receiving device checks, based on the first CRC code, whether an error occurs in the part of the Ethernet frame. For example, the receiving device checks, based on the first CRC code, whether an error occurs in the destination MAC address of the Ethernet frame. Alternatively, the receiving device checks, based on the first CRC code, whether an error occurs in the destination MAC address and the source MAC address that are of the Ethernet frame. Alternatively, the receiving device checks, based on the first CRC code, whether an error occurs in the destination MAC address, the source MAC address, and the VLAN tag that are in the Ethernet frame. Alternatively, the receiving device checks, based on the first CRC code, whether an error occurs in the destination MAC address, the source MAC address, the VLAN tag, and the first Ethernet type that are of the Ethernet frame.

In a possible design, a parameter required for generating the second CRC code may include the destination MAC address, the source MAC address, the first CRC code, the first Ethernet type, and the payload. The receiving device may check, based on the second CRC code, whether an error occurs in the destination MAC address, the source MAC address, the first CRC code, the first Ethernet type, and the payload. In another possible design, a parameter required for generating the second CRC code may include the destination MAC address, the source MAC address, the VLAN tag, the first CRC code, the first Ethernet type, and the payload. The receiving device may check, based on the second CRC code, whether an error occurs in the destination MAC address, the source MAC address, the VLAN tag, the first CRC code, the first Ethernet type, and the payload.

It should be noted that, in actual application, a process of generating the CRC code may further include another parameter, and other approaches describe a process of generating the CRC code.

It should be understood that the receiving device may determine, based on a check result, whether to forward the Ethernet frame in a cut-through forwarding manner. Specifically, the first CRC code may be used to indicate whether to forward the Ethernet frame in the cut-through forwarding manner. For example, if the receiving device checks the part of the Ethernet frame based on the first CRC code, to determine whether no error occurs in the Ethernet frame. Further, the receiving device may forward the Ethernet frame in the cut-through forwarding manner. If the receiving device checks the part of the Ethernet frame based on the first CRC code, to determine that an error occurs in the Ethernet frame. The receiving device avoids forwarding the Ethernet frame in the cut-through forwarding manner. For example, the receiving device may discard the Ethernet frame or request the sending device to resend an Ethernet frame. For example, the receiving device may forward the Ethernet frame in the cut-through forwarding manner when no error occurs in the destination MAC address. The receiving device may discard the Ethernet frame when an error occurs in the destination MAC address.

Further, the Ethernet frame further includes a second Ethernet type, where the second Ethernet type is used to indicate that the first CRC code is a CRC code. The parameter of the first CRC code does not include the second Ethernet type. The second Ethernet type may be carried in the frame header. Specifically, the second Ethernet type may be located after the source MAC address and before the first CRC code. The second Ethernet type may be adjacent to the source MAC address. The second Ethernet type may be adjacent to the first CRC code. For a position of the second Ethernet type in the Ethernet frame, refer to FIG. 3 to FIG. 7.

In a possible design, the receiving device may indicate, by using the second Ethernet type, whether to check the part of the Ethernet frame. For example, after receiving the Ethernet frame, the receiving device may determine, based on the second Ethernet type, that the first CRC code is the CRC code. Further, the receiving device may check the part of the Ethernet frame based on the first CRC code. The receiving device may forward the Ethernet frame in the cut-through forwarding manner when no error occurs in the Ethernet frame.

In this embodiment of this application, a field including the second Ethernet type and the first CRC code may be referred to as a cut-through forwarding frame tag field. For a position of the cut-through forwarding frame tag field in the Ethernet frame, refer to FIG. 3 to FIG. 7.

Figure 3:
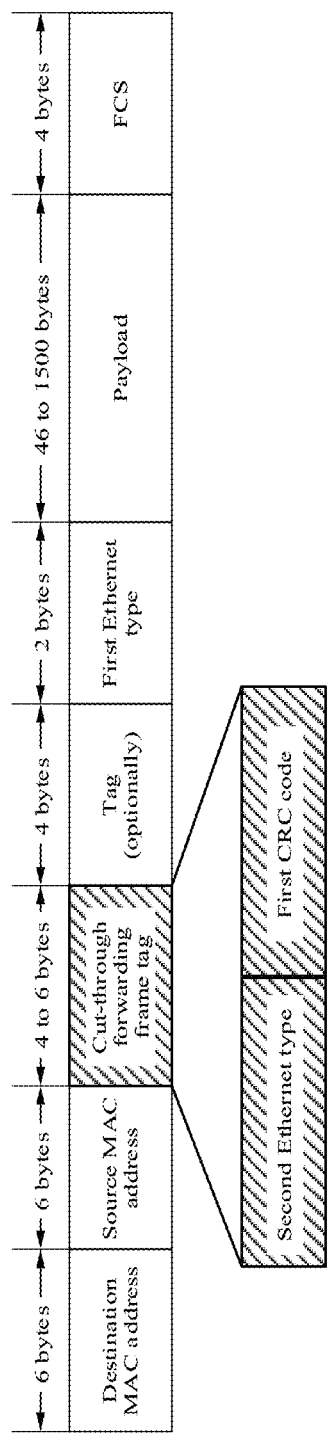
FIG. 3 is an example structural diagram of an Ethernet frame according to an embodiment of this application.

In a first possible implementation, FIG. 3 is an example structural diagram of an Ethernet frame according to an embodiment of this application. The Ethernet frame includes a destination MAC address field, a source MAC address field, a cut-through forwarding frame tag field, a tag field, a first Ethernet type field, a payload field, and an FCS field. The destination MAC address field is used to carry a destination MAC address. The source MAC address field is used to carry a source MAC address. The cut-through forwarding frame tag field is used to carry a second Ethernet type and a first CRC code. The tag field is used to carry a VLAN tag. The first Ethernet type field is used to carry a first Ethernet type. The payload field is used to carry a payload. The FCS field is used to carry a second CRC code. A frame header of the Ethernet frame includes the destination MAC address field, the source MAC address field, the cut-through forwarding frame tag field, the tag field, and the first Ethernet type field. As shown in FIG. 3, the second Ethernet type and the first CRC code may be located after the source MAC address.

It should be noted that a quantity of bits in the destination MAC address field may be 48 bits (6 bytes). A quantity of bits in the source MAC address field may be 48 bits. A quantity of bits in the tag field may be 32 bits (4 bytes). A quantity of bits in the first Ethernet type field may be 16 bits (two bytes). A quantity of bytes in the payload field may be 46 to 1500 bytes. A quantity of bits in the FCS field may be 32 bits (4 bytes). A quantity of bits in the cut-through forwarding frame tag field may be 32 bits (4 bytes) or 48 bits (6 bytes). A quantity of bits in the second Ethernet type and a quantity of bits in the first CRC code that are included in the cut-through forwarding frame tag field may be implemented in the following several manners.

Figure 4:
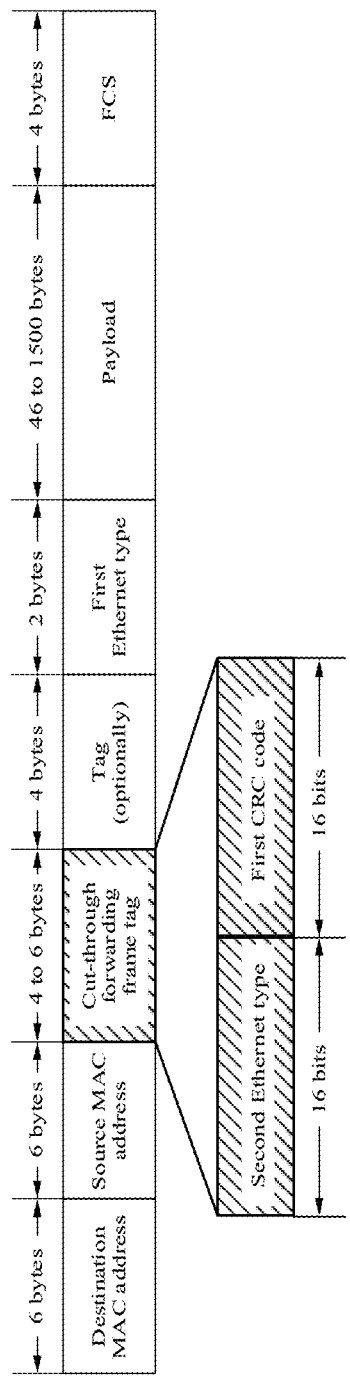
FIG. 4 is an example structural diagram of another Ethernet frame according to an embodiment of this application.

Solution 1: As shown in FIG. 4, the quantity of bits in the second Ethernet type is 16, and the quantity of bits in the first CRC code is 16.

Optionally, the Ethernet frame further includes a version field and a reserved field. The version field and the reserved field may be located between the second Ethernet type and the first CRC code. The version field is used to fill in a version number. The reserved field is used to extend content of the cut-through forwarding frame tag field. The version number may be used to indicate a range of a parameter required for generating the first CRC code. Optionally, the version number may be further used to indicate the reserved field. For example, a version number numbered 1 indicates a base version, and a version number numbered 2 indicates an extended version. It may be understood that the extended version indicates that the reserved field has another function. The version number may be represented by one bit, and the bit may be 0 or 1.

Figure 5:
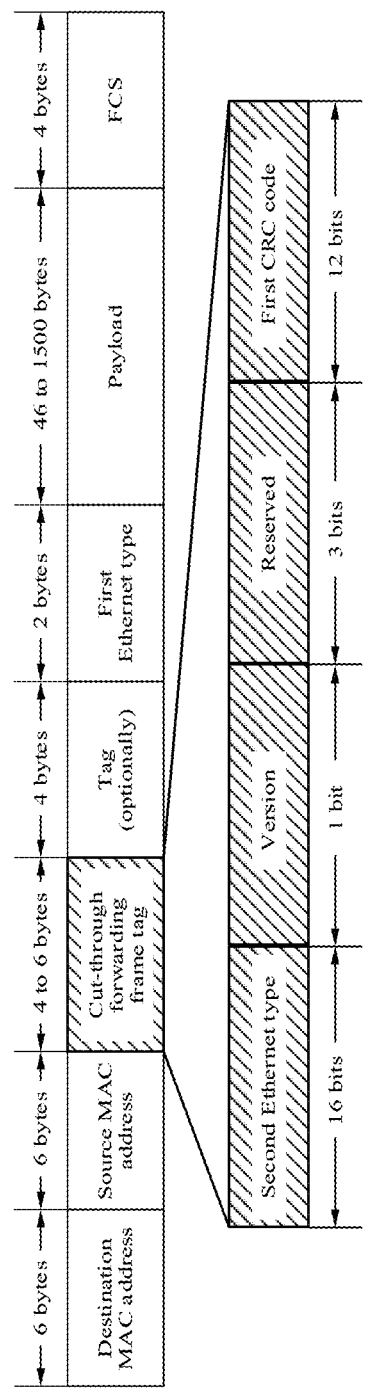
FIG. 5 is an example structural diagram of still another Ethernet frame according to an embodiment of this application.

Solution 2: As shown in FIG. 5, the quantity of bits in the second Ethernet type is 16, a quantity of bits in the version field is 1, a quantity of bits in the reserved field is 3, and the quantity of bits in the first CRC code is 12.

Figure 6:
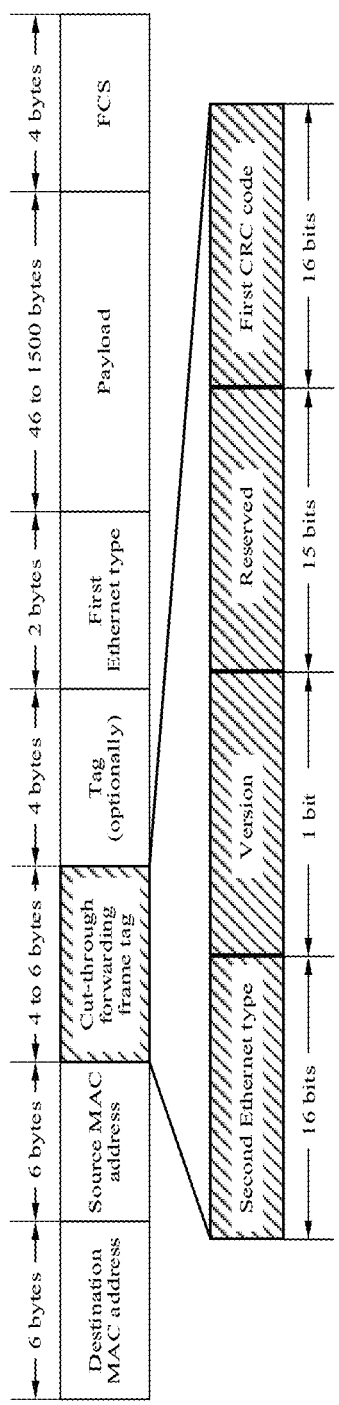
FIG. 6 is an example structural diagram of yet another Ethernet frame according to an embodiment of this application.

Solution 3: As shown in FIG. 6, the quantity of bits in the second Ethernet type is 16, the quantity of bits in the version field is 1, the quantity of bits in the reserved field is 15, and the quantity of bits in the first CRC code is 16.

Figure 7:
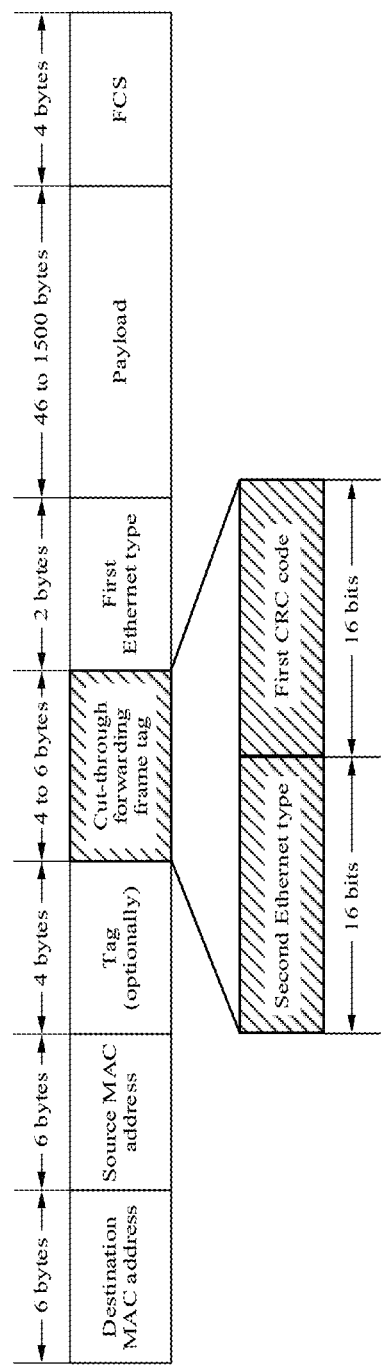
FIG. 7 is an example structural diagram of still yet another Ethernet frame according to an embodiment of this application.

In a second possible implementation, as shown in FIG. 7, the second Ethernet type and the first CRC code may be located after the VLAN tag. For other detailed explanations of the Ethernet frame, refer to the descriptions of the Ethernet frame in the first possible implementation. Details are not described in this embodiment of this application again.

S202: The sending device sends the Ethernet frame to the receiving device.

After generating the Ethernet frame, the sending device sends the Ethernet frame. It should be noted that, before sending the Ethernet frame, the sending device may first determine whether the receiving device corresponding to the destination MAC address can identify the cut-through forwarding frame tag. If the receiving device corresponding to the destination MAC address can identify the cut-through forwarding frame tag, the sending device may insert the cut-through forwarding frame tag into the frame header of the Ethernet frame. If the receiving device corresponding to the destination MAC address cannot identify the cut-through forwarding frame tag, there is no need to insert the cut-through forwarding frame tag into the Ethernet frame. Only an Ethernet frame that does not include the cut-through forwarding frame tag needs to be sent. In actual application, the device may determine, by using another protocol, for example, a Link Layer Discovery Protocol (LLDP), whether the receiving device corresponding to the destination MAC address can identify the cut-through forwarding frame tag.

S203: The receiving device receives the Ethernet frame sent by the sending device.

For explanations of the Ethernet frame, refer to the detailed descriptions of the Ethernet frame in S201. Details are not described in this embodiment of this application again.

Specifically, the receiving device may be a network switch. The network switch may include a plurality of ports. Each port can be an Ethernet port. The network switch may include a network processor and a memory. The network processor is coupled to the memory. The memory may store a computer program. The network processor may process the received Ethernet frame by executing the computer program. The memory may store a MAC forwarding table. The MAC forwarding table may include a plurality of entries. Each entry includes a destination MAC address and a port identifier. The network switch may receive, through an Ethernet port, the Ethernet frame sent by the sending device. In addition, after receiving the Ethernet frame, the receiving device may store the Ethernet frame in the memory of the receiving device. For specific implementation of S203, the receiving device may receive the Ethernet frame in series. Specifically, the receiving device first receives the most significant bit of the Ethernet frame, and finally receives the least significant bit of the Ethernet frame. In a possible implementation, most significant six bytes of the Ethernet frame constitute the destination MAC address. Least significant four bytes of the Ethernet frame constitute the FCS. Therefore, the receiving device first receives the destination MAC address, and then receives the FCS.

S204: The receiving device determines whether an error occurs in the Ethernet frame.

Specifically, the Ethernet frame may arrive at the network switch in a manner of a bit stream. The bit stream may include a start of frame delimiter (SFD) and the Ethernet frame. The SFD is adjacent to the Ethernet frame. After the network switch receives the bit stream, the network processor of the network switch may detect the bit stream, to determine that the bit stream includes the SFD. Further, the network processor may determine that data located after the SFD is the Ethernet frame. The network processor may obtain a field of the Ethernet frame from the bit stream based on a structure of the Ethernet frame. For example, the network processor may determine that data of six bytes after the SFD is the destination MAC address of the Ethernet frame. The network processor may determine that data of six bytes after the destination MAC address is the source MAC address of the Ethernet frame. The network processor may obtain the parameter of the first CRC code and the first CRC code from the Ethernet frame based on the structure of the Ethernet frame. The memory stores an instruction for implementing the CRC algorithm. For example, the instruction includes the generator polynomial. The network processor calculates a CRC code based on the parameter (for example, the destination MAC address) of the first CRC code by executing the instruction. The network processor may determine, through comparison, whether the calculated CRC code is equal to the first CRC code obtained from the Ethernet frame, to determine whether an error occurs in the Ethernet frame. If the calculated CRC code is equal to the first CRC code obtained from the Ethernet frame, it is determined that no error occurs. If the calculated CRC code is not equal to the first CRC code obtained from the Ethernet frame, it is determined that an error occurs.

When the receiving device starts to perform S204, the receiving device does not need to receive the complete Ethernet frame. For example, after the receiving device receives the parameter of the first CRC code and the first CRC code, the receiving device may determine whether an error occurs in the Ethernet frame. For example, whether an error occurs in the destination MAC address is determined. The receiving device does not need to receive the FCS. When the parameter of the first CRC code includes a part of the payload, the receiving device needs to receive the part of the payload, and does not need to receive the complete payload. When the parameter of the first CRC code does not include the payload, the receiving device does not need to receive the payload. The Ethernet frame is transmitted in series in a network. That the receiving device receives the Ethernet frame is a continuous process and needs a period of time. Therefore, the receiving device needs a period of time to perform S203. In addition, S204 performed by the receiving device may include: obtaining the parameter and the first CRC code, calculating the CRC code, and comparing the first CRC code with the calculated CRC code. Therefore, the receiving device needs a period of time to perform S204. When the receiving device starts to perform S204, the receiving device may not complete S203 (the complete Ethernet frame is not received yet). However, when the receiving device completes S204, the receiving device may complete S203 (the complete Ethernet frame is received), or may not complete S203.

Content checked by the receiving device based on the first CRC code may also be different based on different parameters required for generating the first CRC code. Therefore, S204 may be implemented in a plurality of different manners. For example, S204 may be implemented in one of S204a to S204e. The following describes possible implementations.

Manner 1: If the parameter of the first CRC code includes the destination MAC address, S204a is performed.

S204a: The receiving device checks the destination MAC address based on the first CRC code, to determine whether an error occurs in the destination MAC address.

In the foregoing technical solution, the parameter of the first CRC code includes the destination MAC address. The determining whether an error occurs in the destination MAC address may specifically include: using the destination MAC address as input data (or referred to as a dividend), and using the generator polynomial corresponding to the CRC algorithm as a divisor, to calculate a remainder. If the calculated remainder is equal to the first CRC code, it is considered that no error occurs in the parameter (including the destination MAC address) of the first CRC code. If the calculated remainder is not equal to the first CRC code, it is considered that an error occurs in the parameter (including the destination MAC address) of the first CRC code.

If determining that no error occurs in the destination MAC address, the receiving device performs S205. If determining that an error occurs in the destination MAC address, the receiving device performs S206.

Manner 2: If the parameter of the first CRC code includes the destination MAC address and the source MAC address, S204b is performed.

S204b: The receiving device checks the destination MAC address and the source MAC address based on the first CRC code, to determine whether an error occurs in the destination MAC address and the source MAC address.

In the solution of S204b to S204e, the parameter of the first CRC code includes a plurality of parameters. In addition, the first CRC code may be one CRC code, or may be a plurality of CRC codes. The plurality of CRC codes one-to-one correspond to the plurality of parameters.

The following describes a specific implementation of S204b by using an example in which the first CRC code is one CRC code. For a specific implementation of S204c to S204e, refer to the specific implementation of S204b. The parameter of the first CRC code includes a plurality of parameters. Specifically, the plurality of parameters include the destination MAC address and the source MAC address. In specific implementation of S204b, the destination MAC address and the source MAC address are used as input data (or referred to as a dividend), and the generator polynomial corresponding to the CRC algorithm is used as a divisor, to calculate a remainder. If the calculated remainder is equal to the first CRC code, it is considered that no error occurs in the parameter (including the destination MAC address and the source MAC address) of the first CRC code. If the calculated remainder is not equal to the first CRC code, it is considered that an error occurs in the parameter (including the destination MAC address and the source MAC address) of the first CRC code. It should be noted that, in a scenario in which the first CRC code includes a plurality of parameters, when it is determined that an error occurs in the parameter of the first CRC code, it can only be determined, based on the CRC algorithm, that an error occurs in at least one of the plurality of parameters. However, a specific position in which the error occurs cannot be determined. For example, it cannot be determined that the error is specifically an error occurring in the source MAC address, an error occurring in the destination MAC address, or an error occurring in the source MAC address and the destination MAC address. In other words, when checking the plurality of parameters (for example, the source MAC address and the destination MAC address in S204b) in the Ethernet frame based on the first CRC code, the receiving device checks the plurality of parameters (for example, the source MAC address and the destination MAC address in S204b) as a whole.

The following describes a specific implementation of S204b by using an example in which the first CRC code is a plurality of CRC codes. For a specific implementation of S204c to S204e, refer to the specific implementation of S204b. The first CRC code is a CRC code 1 and a CRC code 2. The parameter of the first CRC code includes a plurality of parameters. Specifically, the plurality of parameters include the destination MAC address and the source MAC address. The CRC code 1 corresponds to the destination MAC address, and the CRC code 2 corresponds to the source MAC address. In specific implementation of S201, the sending device obtains the CRC code 1 based on the CRC algorithm and the destination MAC address. The sending device obtains the CRC code 2 based on the CRC algorithm and the source MAC address. In specific implementation of S204b, the receiving device uses the destination MAC address in the received Ethernet frame as input data (or referred to as a dividend), and uses the generator polynomial corresponding to the CRC algorithm as a divisor, to calculate a remainder. If the calculated remainder is equal to the CRC code 1 in the received Ethernet frame, it is considered that no error occurs in the destination MAC address in the received Ethernet frame. If the calculated remainder is not equal to the CRC code 1, it is considered that an error occurs in the destination MAC address in the received Ethernet frame. For specific implementation of S204b, the receiving device uses the source MAC address in the received Ethernet frame as input data (or referred to as a dividend), and uses the generator polynomial corresponding to the CRC algorithm as a divisor, to calculate a remainder. If the calculated remainder is equal to the CRC code 2 in the received Ethernet frame, it is considered that no error occurs in the source MAC address in the received Ethernet frame. If the calculated remainder is not equal to the CRC code 2, it is considered that an error occurs in the source MAC address in the received Ethernet frame. Compared with a scenario in which the first CRC code is one CRC code, in the solution in which the first CRC code is the plurality of CRC codes, not only it can be determined that an error occurs in at least one of the plurality of parameters of the first CRC code, but also it can be determined where the error specifically occurs. For example, it can be determined that the error is specifically an error occurring in the source MAC address, an error occurring in the destination MAC address, or an error occurring in the source MAC address and the destination MAC address.

If determining that no error occurs in the destination MAC address and the source MAC address, the receiving device performs S205. If determining that an error occurs in the destination MAC address and the source MAC address, the receiving device performs S206.

Manner 3: If the parameter of the first CRC code includes the destination MAC address, the source MAC address, and the VLAN tag, S204c is performed.

S204c: The receiving device checks the destination MAC address, the source MAC address, and the VLAN tag based on the first CRC code, to determine whether an error occurs in the destination MAC address, the source MAC address, and the VLAN tag.

If determining that no error occurs in the destination MAC address, the source MAC address, and the VLAN tag, the receiving device performs S205. If determining that an error occurs in the destination MAC address, the source MAC address, and the VLAN tag, the receiving device performs S206.

Manner 4: If the parameter of the first CRC code includes the destination MAC address, the source MAC address, and the first Ethernet type, S204d is performed.

S204d: The receiving device checks the destination MAC address, the source MAC address, and the first Ethernet type based on the first CRC code, to determine whether an error occurs in the destination MAC address, the source MAC address, and the first Ethernet type.

If determining that no error occurs in the destination MAC address, the source MAC address, and the first Ethernet type, the receiving device performs S205. If determining that an error occurs in the destination MAC address, the source MAC address, and the first Ethernet type, the receiving device performs S206.

Manner 5: If the parameter of the first CRC code includes the destination MAC address, the source MAC address, the VLAN tag, and the first Ethernet type, S204e is performed.

S204e: The receiving device checks the destination MAC address, the source MAC address, the VLAN tag, and the first Ethernet type based on the first CRC code, to determine whether an error occurs in the destination MAC address, the source MAC address, the VLAN tag, and the first Ethernet type.

If determining that no error occurs in the destination MAC address, the source MAC address, the VLAN tag, and the first Ethernet type, the receiving device performs S205. If determining that an error occurs in the destination MAC address, the source MAC address, the VLAN tag, and the first Ethernet type, the receiving device performs S206.

S205: The receiving device forwards the Ethernet frame based on the destination MAC address.

The receiving device forwards the Ethernet frame in the cut-through forwarding manner based on the destination MAC address. Specifically, the network processor uses the destination MAC address in the Ethernet frame as a search keyword, to search the MAC forwarding table for an entry that matches the destination MAC address in the Ethernet frame. An egress port configured to forward the Ethernet frame is determined based on a port identifier in the matched entry. The egress port configured to forward the Ethernet frame is a port indicated by the port identifier in the matched entry. The network processor sends the Ethernet frame through the port.

S206: The receiving device discards the Ethernet frame or sends a retransmission request message to the sending device.

Specifically, the receiving device determines, based on S204, that an error occurs in the Ethernet frame. This error may occur in a transmission process of the Ethernet frame from the sending device to the receiving device. Because the receiving device determines, based on S204, that an error occurs in the Ethernet frame, the receiving device does not need to use the destination MAC address in the Ethernet frame as the search keyword, to search the MAC forwarding table for the entry that matches the destination MAC address in the Ethernet frame. In other words, the receiving device may discard the Ethernet frame without needing to search the MAC forwarding table. For example, the network processor may delete the Ethernet frame stored in the memory.

The retransmission request message is used to indicate the sending device to resend an Ethernet frame.

Further, after the receiving device checks a part of the Ethernet frame based on the first CRC code and forwards the part of the Ethernet frame, the method further includes: The receiving device checks the destination MAC address, the source MAC address, the VLAN tag, the second Ethernet type, the first CRC code, the first Ethernet type, and the payload based on the second CRC code, to determine whether an error occurs in the destination MAC address, the source MAC address, the VLAN tag, the second Ethernet type, the first CRC code, the first Ethernet type, and the payload.

Therefore, the first CRC code is added to the Ethernet frame, so that the receiving device can forward the Ethernet frame in the cut-through forwarding manner when the receiving device determines, based on the first CRC code, that a part of the received Ethernet frame is correct, to avoid forwarding an Ethernet frame in which an error occurs.

Figure 8A:
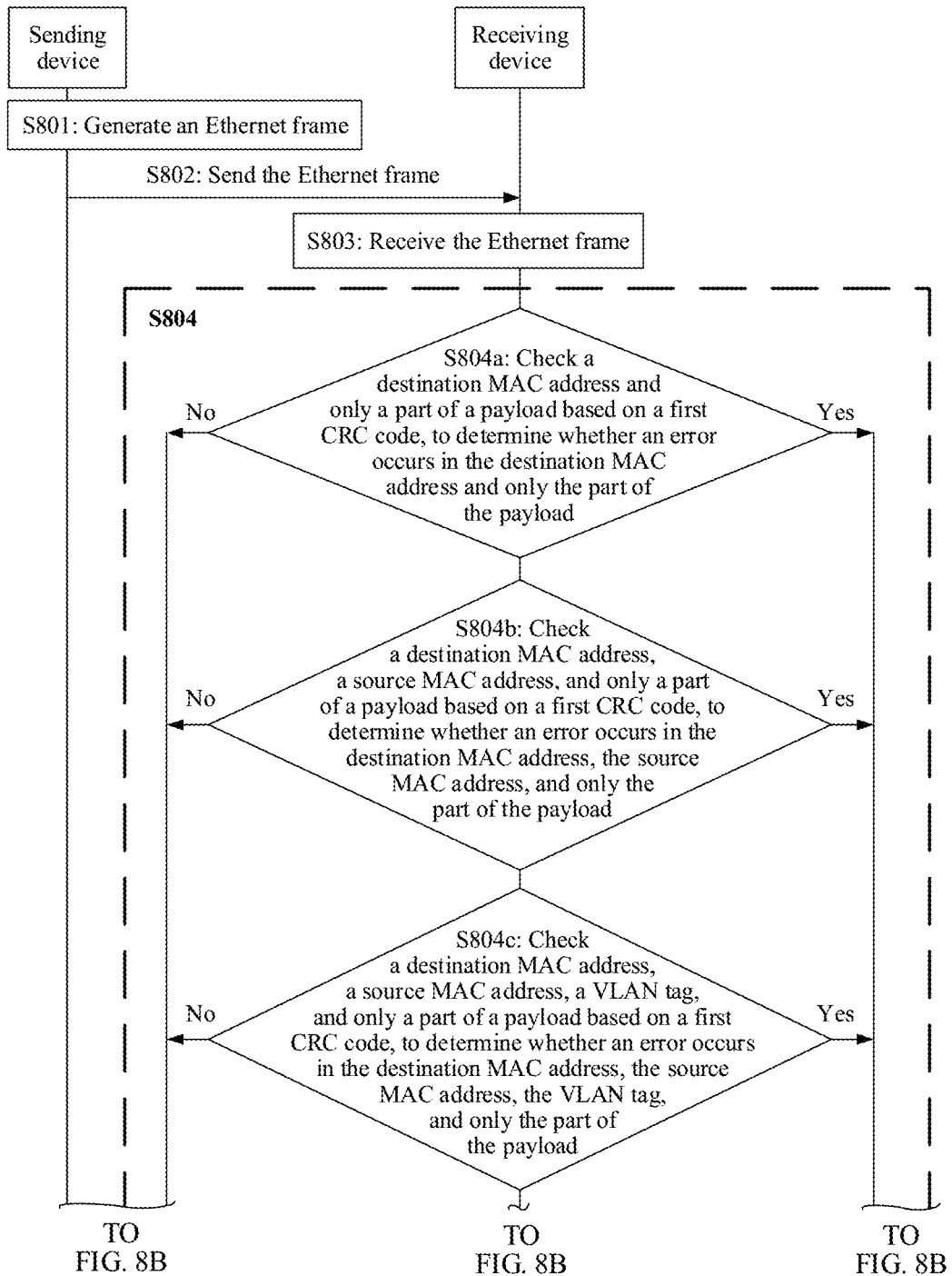
FIG. 8A and FIG. 8B are a flowchart of another data transmission method according to an embodiment of this application.
Figure 8B:
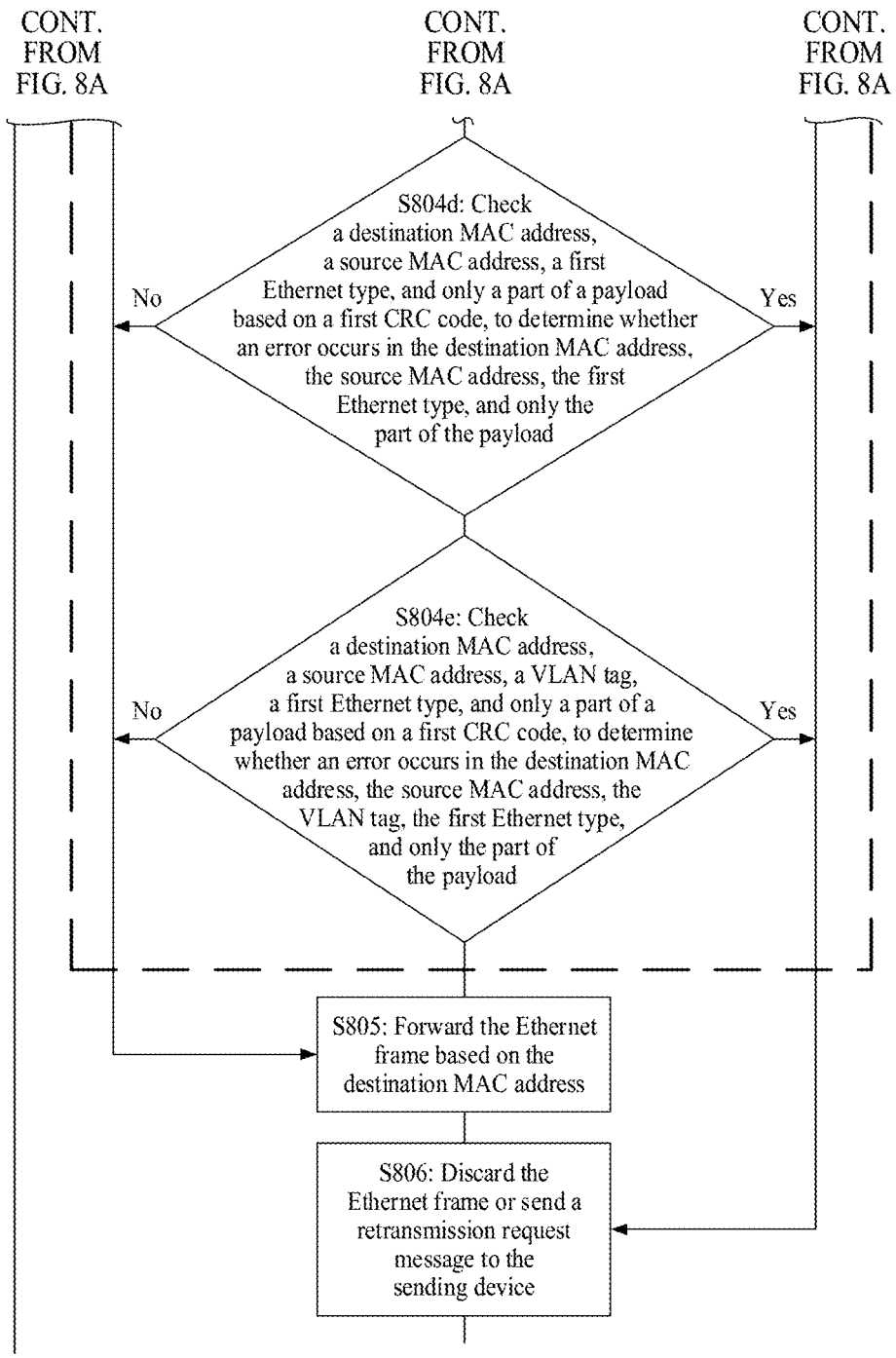

FIG. 8A and FIG. 8B are a flowchart of another data transmission method according to an embodiment of this application. As shown in FIG. 8A and FIG. 8B, in a possible implementation, the method may include S801 to S805. In another possible implementation, the method may include S801 to S804 and S806. The method shown in FIG. 8A and FIG. 8B is obtained by extending the method shown in FIG. 2A and FIG. 2B. For a specific implementation of the method shown in FIG. 8A and FIG. 8B, refer to the description of the method shown in FIG. 2A and FIG. 2B in this application. Different from the method shown in FIG. 2A and FIG. 2B, in the method shown in FIG. 8A and FIG. 8B, a parameter of a first CRC code not only includes a destination MAC address, but also includes only a part of a payload. That the parameter of the first CRC code includes only the part of the payload means that the parameter of the first CRC code includes a part of the payload but does not include the entire payload.

S801: A sending device generates an Ethernet frame.

Different from the Ethernet frame described in S201, in S801, in addition to the part (for example, the destination MAC address) of the Ethernet frame, a parameter required for generating the first CRC code further includes only the part of the payload. The payload includes a protocol packet, and the protocol packet includes a protocol header and a packet payload. Only the part of the payload may be at least one part of the protocol header. For example, the protocol packet may be an IP packet. The protocol header may be an IP header. The packet payload may be an IP payload. Only the part of the payload may be a destination IP address in the IP header. Only the part of the payload may alternatively be a destination IP address and a source IP address that are in the IP header. Certainly, only the part of the payload may alternatively include another field of the IP packet header. The other field may be a version field, a type of service field, or a protocol field. This is not limited in this embodiment of this application. Therefore, a receiving device checks, based on the first CRC code, whether an error occurs in the destination MAC address and the only the part of the payload that are in the Ethernet frame. Alternatively, a receiving device checks, based on the first CRC code, whether an error occurs in the destination MAC address, a source MAC address, and the only the part of the payload that are in the Ethernet frame. Alternatively, a receiving device checks, based on the first CRC code, whether an error occurs in the destination MAC address, a source MAC address, a VLAN tag, and the only the part of the payload that are in the Ethernet frame. Alternatively, the receiving device checks, based on the first CRC code, whether an error occurs in the destination MAC address, a source MAC address, a VLAN tag, a first Ethernet type, and the only the part of the payload that are in the Ethernet frame.

In addition, for a specific implementation of S801, refer to the detailed descriptions in S201. Details are not described in this embodiment of this application again.

S802: The sending device sends the Ethernet frame to the receiving device.

For a specific implementation of S802, refer to the detailed descriptions in S202. Details are not described in this embodiment of this application again.

S803: The receiving device receives the Ethernet frame sent by the sending device.

For a specific implementation of S803, refer to the detailed descriptions in S203. Details are not described in this embodiment of this application again.

S804: The receiving device determines whether an error occurs in the Ethernet frame.

For a specific implementation of S804, refer to the detailed descriptions in S204. Details are not described in this embodiment of this application again.

Different from the method shown in FIG. 2A and FIG. 2B, in the method shown in FIG. 8A and FIG. 8B, the parameter of the first CRC code further includes only the part of the payload.

For specific implementation of S804, a network processor may obtain the parameter of the first CRC code and the first CRC code from the Ethernet frame based on a structure of the Ethernet frame. When obtaining the only the part of the payload from the Ethernet frame, the network processor may determine a structure of the payload based on a value of the first Ethernet type in the Ethernet frame. In this way, only the part of the payload is obtained from the payload. For example, when it is determined that the value of the first Ethernet type is 0x0800, the network processor may determine that the payload includes an IPv4 packet. The network processor may obtain the parameter of the first CRC code from the payload based on a format of the IPv4 packet. In a possible implementation, only the part of the payload is a protocol field, a source IP address field, and a destination IP address field that are in an IPv4 header. The network processor may determine, based on the format of the IPv4 packet, that a quantity of bytes of the protocol field is 1, a quantity of bytes of the source IP address field is 4, and a quantity of bytes of the destination IP address field is 4. In addition, the protocol field is located in the $10^{th}$ byte of the payload, the source IP address field is located in the $13^{th}$ to $16^{th}$ bytes of the payload, and the destination IP address field is located in the $17^{th}$ to $20^{th}$ bytes of the payload.

A memory stores an instruction for implementing a CRC algorithm. For example, the instruction includes a generator polynomial. The network processor calculates a CRC code based on the parameter (for example, the destination MAC address, the protocol field, the source IP address field, and the destination IP address field) of the first CRC code by executing the instruction.

The network processor may determine, through comparison, whether the calculated CRC code is equal to the first CRC code obtained from the Ethernet frame, to determine whether an error occurs in the Ethernet frame. If the calculated CRC code is equal to the first CRC code obtained from the Ethernet frame, it is determined that no error occurs. If the calculated CRC code is not equal to the first CRC code obtained from the Ethernet frame, it is determined that an error occurs.

Content checked by the receiving device based on the first CRC code may also be different based on different parameters required for generating the first CRC code. Therefore, S804 may be implemented in a plurality of different manners. For example, S804 may be implemented in one of S804a to S804e. The following describes possible implementations.

Manner 1: If the parameter of the first CRC code includes the destination MAC address and only the part of the payload, S804a is performed.

S804a: The receiving device checks the destination MAC address and only the part of the payload based on the first CRC code, to determine whether an error occurs in the destination MAC address and only the part of the payload.

The parameter of the first CRC code in each solution in S804a to S804e includes a plurality of parameters. In addition, the first CRC code may be one CRC code, or may be a plurality of CRC codes. The plurality of CRC codes one-to-one correspond to the plurality of parameters. The parameter of the first CRC code in S204b is different from the parameter of the first CRC code in S804a. For example, the parameter of the first CRC code in S204b does not relate to the payload, and the parameter of the first CRC code in S804a relates to the payload. However, the parameter of the first CRC code in S204b is a plurality of parameters, and the parameter of the first CRC code in S804a is also a plurality of parameters. Therefore, for a specific implementation of S804a, refer to the description of S204b in the specification of this application. Details are not described herein again.

If determining that no error occurs in the destination MAC address and only the part of the payload, the receiving device performs S805. If determining that an error occurs in the destination MAC address and only the part of the payload, the receiving device performs S806.

Manner 2: If the parameter of the first CRC code includes the destination MAC address, the source MAC address, and only the part of the payload, S804b is performed.

S804b: The receiving device checks the destination MAC address, the source MAC address, and only the part of the payload based on the first CRC code, to determine whether an error occurs in the destination MAC address, the source MAC address, and only the part of the payload.

If determining that no error occurs in the destination MAC address, the source MAC address, and only the part of the payload, the receiving device performs S805. If determining that an error occurs in the destination MAC address, the source MAC address, and only the part of the payload, the receiving device performs S806.

Manner 3: If the parameter of the first CRC code includes the destination MAC address, the source MAC address, the VLAN tag, and only the part of the payload, S804c is performed.

S804c: The receiving device checks the destination MAC address, the source MAC address, the VLAN tag, and only the part of the payload based on the first CRC code, to determine whether an error occurs in the destination MAC address, the source MAC address, the VLAN tag, and only the part of the payload.

If determining that no error occurs in the destination MAC address, the source MAC address, the VLAN tag, and only the part of the payload, the receiving device performs S805. If determining that an error occurs in the destination MAC address, the source MAC address, the VLAN tag, and only the part of the payload, the receiving device performs S806.

Manner 4: If the parameter of the first CRC code includes the destination MAC address, the source MAC address, the first Ethernet type, and only the part of the payload, S804d is performed.

S804d: The receiving device checks the destination MAC address, the source MAC address, the first Ethernet type, and only the part of the payload based on the first CRC code, to determine whether an error occurs in the destination MAC address, the source MAC address, the first Ethernet type, and only the part of the payload.

If determining that no error occurs in the destination MAC address, the source MAC address, the first Ethernet type, and only the part of the payload, the receiving device performs S805. If determining that an error occurs in the destination MAC address, the source MAC address, the first Ethernet type, and only the part of the payload, the receiving device performs S806.

Manner 5: If the parameter of the first CRC code includes the destination MAC address, the source MAC address, the VLAN tag, the first Ethernet type, and only the part of the payload, S804e is performed.

S804e: The receiving device checks the destination MAC address, the source MAC address, the VLAN tag, the first Ethernet type, and only the part of the payload based on the first CRC code, to determine whether an error occurs in the destination MAC address, the source MAC address, the VLAN tag, the first Ethernet type, and only the part of the payload.

If determining that no error occurs in the destination MAC address, the source MAC address, the VLAN tag, the first Ethernet type, and only the part of the payload, the receiving device performs S805. If determining that an error occurs in the destination MAC address, the source MAC address, the VLAN tag, the first Ethernet type, and only the part of the payload, the receiving device performs S806.

S805: The receiving device forwards the Ethernet frame based on the destination MAC address.

The receiving device forwards the Ethernet frame in a cut-through forwarding manner based on the destination MAC address. For specific implementation of S805, refer to the description of S205 in the embodiment.

S806: The receiving device discards the Ethernet frame or sends a retransmission request message to the sending device.

For a specific implementation of S806, refer to the description of S206 in the embodiment.

The retransmission request message is used to indicate the sending device to resend an Ethernet frame.

Further, after the receiving device checks a part of the Ethernet frame based on the first CRC code and forwards the part of the Ethernet frame, the method further includes: The receiving device checks the destination MAC address, the source MAC address, the VLAN tag, the second Ethernet type, the first CRC code, the first Ethernet type, and the payload based on the second CRC code, to determine whether an error occurs in the destination MAC address, the source MAC address, the VLAN tag, the second Ethernet type, the first CRC code, the first Ethernet type, and the payload.

Therefore, the first CRC code is added to the Ethernet frame, so that the receiving device can forward the Ethernet frame in the cut-through forwarding manner when the receiving device determines, based on the first CRC code, that a part of the received Ethernet frame is correct, to avoid forwarding the Ethernet frame in which an error occurs.

In the foregoing embodiments provided in this application, the methods provided in the embodiments of this application are separately described from perspectives of the sending device, the receiving device, and interaction between the sending device and the receiving device. It may be understood that, to implement functions in the methods provided in the embodiments of this application, each of network elements, for example, the sending device and the receiving device, includes a corresponding hardware structure and/or software module for performing the functions. A person skilled in the art should easily be aware that, in combination with the examples described in the embodiments disclosed in this specification, algorithms steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, division into the functional modules may be performed on the sending device and the receiving device based on the foregoing method example. For example, each functional module may be obtained through division based on a corresponding function, or two or more functions may be integrated into one processing module. The integrated module may be implemented in a form of hardware, or may be implemented in a form of a software functional module. It should be noted that, in the embodiments of this application, division into the modules is an example, and is merely logical function division. In actual implementation, another division manner may be used.

Figure 9:
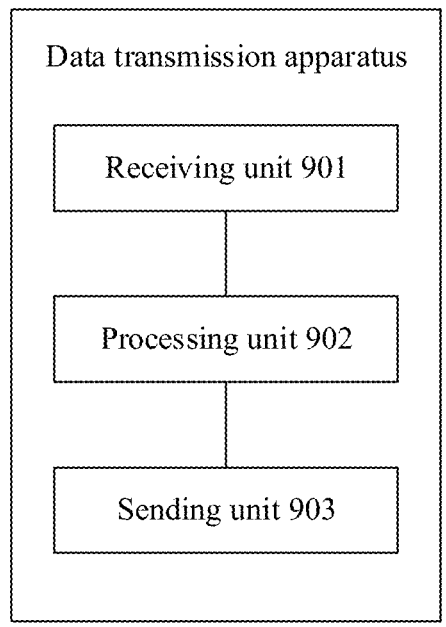
FIG. 9 is an example composition diagram of a data transmission apparatus according to an embodiment of this application.

FIG. 9 is a possible schematic composition diagram of a data transmission apparatus. The data transmission apparatus can perform the methods described in the foregoing embodiments. For example, the data transmission apparatus shown in FIG. 9 can perform the steps performed by the network device shown in FIG. 2A and FIG. 2B or FIG. 8A and FIG. 8B. The network device may be a sending device or a receiving device. As shown in FIG. 9, the data transmission apparatus is a network device or a communications apparatus that supports the network device in implementing the methods provided in the embodiments. For example, the communications apparatus may be a chip system. The data transmission apparatus may include a receiving unit 901, a processing unit 902, and a sending unit 903.

If the network device is used as the receiving device, the receiving unit 901 is configured to support the data transmission apparatus in performing the methods described in the embodiments of this application. For example, the receiving unit 901 is configured to perform or support the data transmission apparatus in performing S203 in the data transmission method shown in FIG. 2A and FIG. 2B. The receiving unit 901 is configured to perform or support the data transmission apparatus in performing S803 in the data transmission method shown in FIG. 8A and FIG. 8B.

The processing unit 902 is configured to perform or support the data transmission apparatus in performing S204 in the data transmission method shown in FIG. 2A and FIG. 2B, for example, perform S204a to S204e. The processing unit 902 is configured to perform or support the data transmission apparatus in performing S804 in the data transmission method shown in FIG. 8A and FIG. 8B, for example, perform S804a to S804e.

The sending unit 903 is configured to perform or support the data transmission apparatus in performing S205 and S206 in the data transmission method shown in FIG. 2A and FIG. 2B. The sending unit 903 is configured to perform or support the data transmission apparatus in performing S805 and S806 in the data transmission method shown in FIG. 8A and FIG. 8B.

If the network device is used as the sending device, the processing unit 902 is configured to support the data transmission apparatus in performing the methods described in the embodiments of this application. For example, the processing unit 902 is configured to perform or support the data transmission apparatus in performing S201 in the data transmission method shown in FIG. 2A and FIG. 2B. The processing unit 902 is configured to perform or support the data transmission apparatus in performing S801 in the data transmission method shown in FIG. 8A and FIG. 8B. The sending unit 903 is configured to perform or support the data transmission apparatus in performing S202 in the data transmission method shown in FIG. 2A and FIG. 2B. The sending unit 903 is configured to perform or support the data transmission apparatus in performing S802 in the data transmission method shown in FIG. 8A and FIG. 8B.

It should be noted that all related content of the steps in the embodiment corresponding to FIG. 2A and FIG. 2B or FIG. 8A and FIG. 8B may be cited in function descriptions of corresponding functional modules shown in FIG. 9. Details are not described herein again.

The data transmission apparatus provided in this embodiment of this application is configured to perform the method in any one of the foregoing embodiments, and therefore a same effect can be achieved as that of the methods in the foregoing embodiments.

Figure 10:
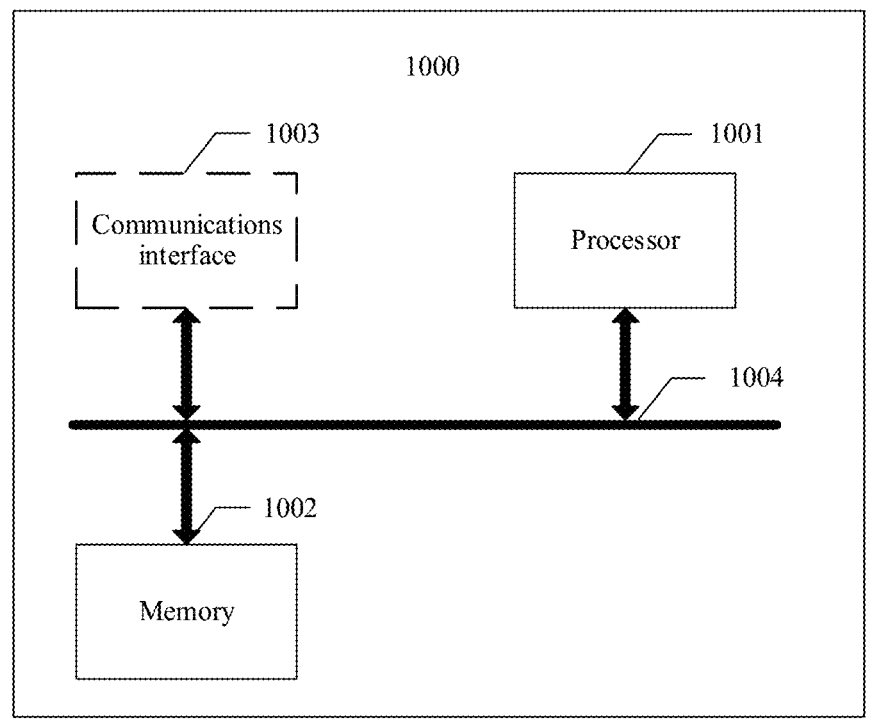
FIG. 10 is an example composition diagram of a communications apparatus according to an embodiment of this application.

FIG. 10 shows a communications apparatus 1000 according to an embodiment of this application. The communications apparatus 1000 is configured to implement functions of the network device in the foregoing embodiments. For example, the communications apparatus 1000 may perform the method shown in FIG. 2A and FIG. 2B or FIG. 8A and FIG. 8B. The communications apparatus 1000 may be a network device, or may be an apparatus in the network device. The communications apparatus 1000 may be a chip system. In this embodiment of this application, the chip system may include a chip, or may include a chip and another discrete component.

The communications apparatus 1000 includes at least one processor 1001, configured to implement the methods provided in the embodiments of this application. For example, the processor 1001 may be configured to check a destination MAC address based on a first CRC code, to determine whether an error occurs in the destination MAC address. For details, refer to detailed descriptions in the method examples. Details are not described herein again.

The communications apparatus 1000 may further include at least one memory 1002, configured to store a program instruction and/or data. The memory 1002 is coupled to the processor 1001. Coupling in this embodiment of this application is an indirect coupling or a communication connection between apparatuses, units, or modules, may be in an electrical form, a mechanical form, or another form, and is used for information exchange between the apparatuses, the units, or the modules. The processor 1001 may operate with the memory 1002. The processor 1001 may execute the program instruction stored in the memory 1002. The at least one memory may be included in the at least one processor.

The communications apparatus 1000 may further include a communications interface 1003, configured to communicate with another device through a transmission medium, so that an apparatus in the communications apparatus 1000 can communicate with the other device. For example, if the communications apparatus is a network device, the other device is a terminal device. The processor 1001 receives and sends data through the communications interface 1003, and is configured to implement the methods performed by the network device in the embodiments corresponding to FIG. 2A and FIG. 2B and FIG. 8A and FIG. 8B.

A specific connection medium between the communications interface 1003, the processor 1001, and the memory 1002 is not limited in this embodiment of this application. In this embodiment of this application, in FIG. 10, the communications interface 1003, the processor 1001, and the memory 1002 are connected by using a bus 1004. The bus is represented by using a thick line in FIG. 10. A manner of connection between other components is merely an example for description, and constitutes no limitation. The bus may be classified into an address bus, a data bus, a control bus, and the like. For ease of representation, only one thick line is used to represent the bus in FIG. 10, but this does not mean that there is only one bus or only one type of bus.

A structure of the communications apparatus 1000 shown in FIG. 10 is a possible implementation of the data transmission apparatus shown in FIG. 9. Specifically, the communications interface 1003 may be configured to implement the receiving unit 901 and the sending unit 903. The processor 1001 may implement the processing unit 902 by executing the program in the memory 1002.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in the embodiments of this application. The general-purpose processor may be a microprocessor, any conventional processor, or the like. The steps of the method disclosed with reference to the embodiments of this application may be directly performed by a hardware processor, or may be performed by using a combination of hardware in the processor and a software module.

In the embodiments of this application, the memory may be a non-volatile memory, for example, a hard disk drive (HDD) or a solid-state drive (SSD), or may be a volatile memory, for example, a random-access memory (RAM). The memory is any other medium that can be configured to carry or store expected program code in a form of an instruction or a data structure and that can be accessed by a computer. However, the memory is not limited thereto. The memory in the embodiments of this application may alternatively be a circuit or any other apparatus that can implement a storage function, and is configured to store a program instruction and/or data.

The foregoing descriptions about implementations allow a person skilled in the art to understand that, for the purpose of convenient and brief description, division into the foregoing functional modules is used as an example for illustration. In actual application, the foregoing functions can be allocated to different functional modules for implementation based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, division into the modules or units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

All or some of the foregoing methods in the embodiments of this application may be implemented by software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of the present disclosure are all or partially generated. The computer may be a general-purpose computer, a special-purpose computer, a computer network, a network device, a terminal, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a digital video disc (DVD), a semiconductor medium (for example, an SSD), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A data transmission method implemented by a network device, comprising:
   receiving an Ethernet frame, wherein the Ethernet frame comprises a destination media access control (MAC) address, a first cyclic redundancy check (CRC) code, and a payload, and wherein a parameter of the first CRC code comprises the destination MAC address and only a part of the payload;
   checking, based on the first CRC code, the destination MAC address and only the part of the payload to determine whether a first error is in the destination MAC address and only the part of the payload; and
   forwarding the Ethernet frame based on the destination MAC address when the first error is not in the destination MAC address and the only the part of the payload.

2. The data transmission method of claim 1, wherein the Ethernet frame further comprises a first Ethernet type, wherein the first Ethernet type identifies the first CRC code, wherein the parameter does not comprise the first Ethernet type, and wherein the data transmission method further comprises:
   determining, based on the first Ethernet type, the first CRC code; and checking, in response to determining the first CRC code, the destination MAC address based on the first CRC code.

3. The data transmission method of claim 1, wherein the Ethernet frame further comprises a virtual local area network (VLAN) tag, wherein the parameter further comprises the VLAN tag, and wherein the data transmission method further comprises:
checking, based on the first CRC code, the destination MAC address and the VLAN tag to determine whether a second error is in the destination MAC address and the VLAN tag; and
forwarding the Ethernet frame based on the destination MAC address when the second error is not in the destination MAC address and the VLAN tag.

4. The data transmission method of claim 1, wherein the Ethernet frame further comprises a second Ethernet type, wherein the parameter further comprises the second Ethernet type, wherein the payload comprises a protocol packet, wherein the second Ethernet type indicates a protocol type of the protocol packet in the payload, and wherein the data transmission method further comprises:
checking, based on the first CRC code, the destination MAC address and the second Ethernet type to determine whether a second error is in the destination MAC address and the second Ethernet type; and
forwarding the Ethernet frame based on the destination MAC address when the second error is not in the destination MAC address and the second Ethernet type.

5. The data transmission method of claim 1, wherein the Ethernet frame further comprises a source MAC address, wherein the parameter further comprises the source MAC address, and wherein the data transmission method further comprises:
checking, based on the first CRC code, the destination MAC address and the source MAC address to determine whether a second error is in the destination MAC address and the source MAC address; and
forwarding the Ethernet frame based on the destination MAC address when the second error is not in the destination MAC address and the source MAC address.

6. A data transmission method implemented by a network device, further comprising:
generating an Ethernet frame, wherein the Ethernet frame comprises a destination media access control (MAC) address, a first cyclic redundancy check (CRC) code, and a payload, wherein a parameter of the first CRC code comprises the destination MAC address and only a part of the payload, and wherein the first CRC code is configured to determine whether a first error occurs in the destination MAC address and only the part of the payload; and
sending the Ethernet frame.

7. The data transmission method of claim 6, wherein the Ethernet frame further comprises a first Ethernet type, wherein the first Ethernet type identifies the first CRC code, and wherein the parameter of the first CRC code does not comprise the first Ethernet type.

8. The data transmission method of claim 6, wherein the Ethernet frame further comprises a virtual local area network (VLAN) tag, and wherein the parameter of the first CRC code further comprises the VLAN tag.

9. The data transmission method of claim 6, wherein the Ethernet frame further comprises a second Ethernet type, wherein the parameter of the first CRC code further comprises the second Ethernet type, wherein the payload comprises a protocol packet, and wherein the second Ethernet type indicates a protocol type of the protocol packet in the payload.

10. The data transmission method of claim 6, wherein the Ethernet frame further comprises a source MAC address.

11. A data transmission method implemented by a network device, comprising:
receiving an Ethernet frame, wherein the Ethernet frame comprises a destination media access control (MAC) address, a first cyclic redundancy check (CRC) code, and a payload, and wherein a parameter of the first CRC code comprises the destination MAC address and only a part of the payload;
checking, based on the first CRC code, the destination MAC address and only the part of the payload to determine whether a first error occurs in the destination MAC address and only the part of the payload; and
forwarding the Ethernet frame based on the destination MAC address when the first error is not in the destination MAC address and only the part of the payload.

12. The data transmission method of claim 11, wherein the Ethernet frame further comprises a first Ethernet type, wherein the first Ethernet type identifies the first CRC code, wherein the parameter of the first CRC code does not comprise the first Ethernet type, and wherein the data transmission method further comprises:
determining, based on the first Ethernet type, the first CRC code; and
checking, in response to determining the first CRC code, the destination MAC address based on the first CRC code.

13. The data transmission method of claim 11, wherein the Ethernet frame further comprises a virtual local area network (VLAN) tag, wherein the parameter of the first CRC code further comprises the VLAN tag, and wherein the data transmission method further comprises:
checking, based on the first CRC code, the destination MAC address, only the part of the payload, and the VLAN tag to determine whether a second error occurs in the destination MAC address, only the part of the payload, and the VLAN tag; and
forwarding the Ethernet frame based on the destination MAC address when the second error is not in the destination MAC address, only the part of the payload, and the VLAN tag.

14. The data transmission method of claim 11, wherein the Ethernet frame further comprises a second Ethernet type, wherein the parameter of the first CRC code further comprises the second Ethernet type, wherein the payload comprises a protocol packet, wherein the protocol packet comprises a protocol header and a packet payload, wherein only the part of the payload comprised in the parameter of the first CRC code is at least one part of the protocol header, wherein the second Ethernet type indicates a protocol type of the protocol packet in the payload, and wherein the data transmission method further comprises:
checking, based on the first CRC code, the destination MAC address, only the part of the payload, and the second Ethernet type to determine whether a second error occurs in the destination MAC address, only the part of the payload, and the second Ethernet type; and
forwarding the Ethernet frame based on the destination MAC address when the second error is not in the destination MAC address, only the part of the payload, and the second Ethernet type.

15. The data transmission method of claim 11, wherein the Ethernet frame further comprises a source MAC address, wherein the parameter of the first CRC code further comprises the source MAC address, and wherein the data transmission method further comprises:

checking, based on the first CRC code, the destination MAC address, only the part of the payload, and the source MAC address to determine whether a second error occurs in the destination MAC address, only the part of the payload, and the source MAC address; and forwarding the Ethernet frame based on the destination MAC address when the second error is not in the destination MAC address, only the part of the payload, and the source MAC address.

16. A data transmission method implemented by a network device, comprising:

generating an Ethernet frame, wherein the Ethernet frame comprises a destination media access control (MAC) address, a first cyclic redundancy check (CRC) code, and a payload, wherein a parameter of the first CRC code comprises the destination MAC address and only a part of the payload, and wherein the first CRC code is configured to determine whether a first error occurs in the destination MAC address and only the part of the payload; and sending the Ethernet frame.

17. The data transmission method of claim 16, wherein the Ethernet frame further comprises a first Ethernet type, wherein the first Ethernet type identifies the first CRC code, and wherein the parameter of the first CRC code does not comprise the first Ethernet type.

18. The data transmission method of claim 16, wherein the Ethernet frame further comprises a virtual local area network (VLAN) tag, and wherein the parameter of the first CRC code further comprises the VLAN tag.

19. The data transmission method of claim 16, wherein the Ethernet frame further comprises a second Ethernet type, wherein the parameter of the first CRC code further comprises the second Ethernet type, wherein the payload comprises a protocol packet, wherein the protocol packet comprises a protocol header and a packet payload, wherein only the part of the payload comprised in the parameter of the first CRC code is at least one part of the protocol header, and wherein the second Ethernet type indicates a protocol type of the protocol packet in the payload.

20. The data transmission method of claim 16, wherein the Ethernet frame further comprises a source MAC address.

\* \* \* \* \*